(12) United States Patent
Tashima et al.

(10) Patent No.: US 11,407,271 B2
(45) Date of Patent: Aug. 9, 2022

(54) AIR-CONDITIONING UNIT FOR VEHICLE

(71) Applicant: DENSO CORPORATION, Kariya (JP)

(72) Inventors: Yoshinori Tashima, Kariya (JP); Yasue Yonezu, Kariya (JP); Ryo Kobayashi, Kariya (JP); Takahiro Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 16/741,052

(22) Filed: Jan. 13, 2020

(65) Prior Publication Data

US 2020/0148025 A1 May 14, 2020

Related U.S. Application Data

(63) Continuation of application No. PCT/JP2018/023640, filed on Jun. 21, 2018.

(30) Foreign Application Priority Data

| Jul. 25, 2017 | (JP) | JP2017-143856 |
| Feb. 7, 2018 | (JP) | JP2018-020336 |
| Apr. 17, 2018 | (JP) | JP2018-079112 |

(51) Int. Cl.
*B60H 1/00* (2006.01)
*B60H 1/26* (2006.01)
*B60H 1/34* (2006.01)

(52) U.S. Cl.
CPC ..... *B60H 1/00042* (2013.01); *B60H 1/00064* (2013.01); *B60H 1/00428* (2013.01);
(Continued)

(58) Field of Classification Search
CPC .. B60H 1/00064; B60H 1/00821; B60H 1/26; B60H 1/3407; B60H 2001/00092;
(Continued)

(56) References Cited

U.S. PATENT DOCUMENTS 4,448,112 A * 5/1984 Soderberg ................ B60H 1/26
114/211
4,562,957 A * 1/1986 Nakagawa ......... B60H 1/00292
219/202
(Continued)

FOREIGN PATENT DOCUMENTS

FR 2461136 A1 * 1/1981 ........... B60H 1/3407
FR 2773110 A1 7/1999
(Continued)

*Primary Examiner* — Jenna M Hopkins
(74) *Attorney, Agent, or Firm* — Harness, Dickey & Pierce, P.L.C.

(57) ABSTRACT

An air-conditioning unit for a vehicle includes an air conditioning case, a blower, and a rectifying mechanism. The blower has a blower fan rotating around a fan axis and arranged in an in-case passage of the air conditioning case, and blows out air drawn from one side in an axial direction of the fan axis by rotation of the blower fan. The rectifying mechanism is arranged downstream of the blower fan in the in-case passage, and the air passes through the rectifying mechanism. The blower fan is arranged so that the other side of the fan axis that is opposite to the one side extends toward a downstream side of the in-case passage. The rectifying mechanism suppresses a swirling flow generated by the rotation of the blower fan in the air blown out from the blower fan as compared with the blown-out air prior to flowing into the rectifying mechanism.

8 Claims, 19 Drawing Sheets

(52) U.S. Cl.
CPC ..... *B60H 1/00471* (2013.01); *B60H 1/00821* (2013.01); *B60H 1/26* (2013.01); *B60H 1/345* (2013.01); *B60H 1/3407* (2013.01); *B60H 2001/00092* (2013.01); *B60H 2001/00135* (2013.01); *B60H 2001/00164* (2013.01); *B60H 2001/00178* (2013.01); *B60H 2001/00185* (2013.01)

(58) Field of Classification Search
CPC .......... B60H 2001/00164; B60H 2001/00185; B60H 2001/00721; B60H 1/345; B60H 1/00464; B60H 1/00471; B60H 1/00521; F04D 29/44; F04D 29/54
See application file for complete search history.

(56) References Cited

U.S. PATENT DOCUMENTS

| | | | |
|---|---|---|---|
| 4,852,363 A * | 8/1989 | Kampf | B60H 1/3207 62/176.6 |
| 5,078,574 A * | 1/1992 | Olsen | F04D 19/002 415/182.1 |
| 5,489,186 A * | 2/1996 | Yapp | F01D 5/141 415/208.3 |
| 5,938,527 A | 8/1999 | Oshima et al. | |
| 6,149,513 A * | 11/2000 | Lyu | B60H 1/00378 454/108 |
| 6,558,140 B2 * | 5/2003 | Suzuki | F04D 25/08 417/423.1 |
| 6,918,262 B2 * | 7/2005 | Kamiya | B60H 1/0055 454/136 |
| 6,935,125 B2 * | 8/2005 | Wakuda | B60H 1/00735 62/160 |
| 8,342,922 B2 * | 1/2013 | Deneau | B60H 1/00849 454/906 |
| 9,517,680 B2 * | 12/2016 | Suzuki | B60H 1/00392 |
| 9,802,463 B2 * | 10/2017 | Maeda | B60H 1/00849 |
| 9,821,626 B2 * | 11/2017 | Wittmann | B60H 1/24 |
| 10,036,660 B2 * | 7/2018 | Ishihara | G01F 1/363 |
| 10,369,862 B2 * | 8/2019 | Yamaoka | B60H 1/00564 |
| 10,518,606 B2 * | 12/2019 | Aizawa | B60H 1/00514 |
| 10,570,928 B2 * | 2/2020 | Cocks | F04D 29/667 |
| 10,987,991 B2 * | 4/2021 | Tsumagari | B60H 1/00064 |
| 2007/0137833 A1 * | 6/2007 | Kang | B60H 1/00692 165/42 |
| 2014/0087646 A1 * | 3/2014 | Kitamura | B60H 1/241 454/126 |
| 2014/0087648 A1 * | 3/2014 | Tanigawa | B60H 1/00035 454/160 |
| 2016/0288609 A1 * | 10/2016 | Yamaoka | B60H 1/00678 |
| 2017/0008372 A1 * | 1/2017 | Kato | B60H 1/00064 |
| 2017/0210198 A1 * | 7/2017 | Person | B60H 1/00564 |
| 2018/0298914 A1 * | 10/2018 | Nakamura | F04D 29/4246 |
| 2019/0077213 A1 * | 3/2019 | Kato | B60H 1/00064 |
| 2020/0148025 A1 * | 5/2020 | Tashima | B60H 1/3407 |
| 2020/0156433 A1 * | 5/2020 | Yonezu | B60H 1/0005 |
| 2020/0173445 A1 * | 6/2020 | Kono | F04D 29/282 |
| 2020/0223281 A1 * | 7/2020 | Ide | B60H 1/00521 |
| 2021/0046805 A1 * | 2/2021 | Komatsubara | B60H 1/3435 |
| 2021/0276397 A1 * | 9/2021 | Nakajima | B60H 1/00 |

FOREIGN PATENT DOCUMENTS

| | | | | |
|---|---|---|---|---|
| FR | 2835219 A1 * | 8/2003 | ............ | F24F 13/105 |
| JP | S51-029452 U | 3/1976 | | |
| JP | S53-101646 U | 8/1978 | | |
| JP | H08-276722 A | 10/1996 | | |
| JP | H09-216512 A | 8/1997 | | |
| JP | H10-205496 A | 8/1998 | | |
| JP | 2003-172528 A | 6/2003 | | |
| JP | 2009-062035 A | 3/2009 | | |
| JP | 2009-180457 A | 8/2009 | | |
| JP | 2010-064608 A | 3/2010 | | |
| JP | 2015-182566 A | 10/2015 | | |
| JP | 2016-044586 A | 4/2016 | | |
| JP | 2016-196209 A | 11/2016 | | |
| WO | WO-2017/022652 A1 | 2/2017 | | |
| WO | WO-2018/083940 A1 | 5/2018 | | |
| WO | WO-2017/195454 A1 | 9/2018 | | |
| WO | WO-2019/021706 A1 | 1/2019 | | |

* cited by examiner

AIR-CONDITIONING UNIT FOR VEHICLE

CROSS REFERENCE TO RELATED APPLICATIONS

This application is a continuation application of International Patent Application No. PCT/JP2018/023640 filed on Jun. 21, 2018, which designated the U.S. and claims the benefit of priority from Japanese Patent Application No. 2017-143856 filed on Jul. 25, 2017, Japanese Patent Application No. 2018-020336 filed on Feb. 7, 2018 and Japanese Patent Application No. 2018-079112 filed on Apr. 17, 2018. The entire disclosure of all of the above applications are incorporated herein by reference.

TECHNICAL FIELD

The present disclosure relates to an air-conditioning unit for a vehicle.

BACKGROUND ART

An air-conditioning unit for vehicles typically includes an air conditioning case in which an in-case passage through which air flows is formed and a blower that blows air blown out from the air-conditioning unit for vehicles toward a vehicle interior. Since the blower is a centrifugal blower, the blower has a centrifugal fan (specifically, a sirocco fan) that rotates around a fan axis to blow out the air sucked from one side in an axial direction of the fan axis to the outside in a radial direction. The centrifugal fan is arranged on an air flow upstream side in the in-case passage. The in-case passage extends to one side of the centrifugal fan in the radial direction on an air flow downstream side as compared with the centrifugal fan. That is, the centrifugal fan is arranged so that a fan axis of the centrifugal fan is in a direction orthogonal to an air flow direction on the air flow downstream side with respect to the centrifugal fan.

SUMMARY

One aspect of the present disclosure includes an air conditioning case, a blower, and a rectifying mechanism. The air conditioning case defines therein an in-case passage through which air flows. The blower includes a blower fan rotating about a fan axis and arranged in the in-case passage. The blower blows out an air drawn from one side in an axial direction of the fan axis by rotation of the blower fan. The rectifying mechanism is arranged downstream of the blower fan in an airflow direction in the in-case passage. The air blown by the blower fan passes through the rectifying mechanism. The blower fan has the other side of the fan axis that is opposite to the one side in the axial direction and is arranged so that the other side of the fan axis extends toward a downstream side of the in-case passage. The rectifying mechanism is configured to suppress a swirling flow generated by the rotation of the blower fan in the air blown out from the blower fan as compared with the blown-out air prior to flowing into the rectifying mechanism.

DESCRIPTION OF EMBODIMENTS

Figure 1:
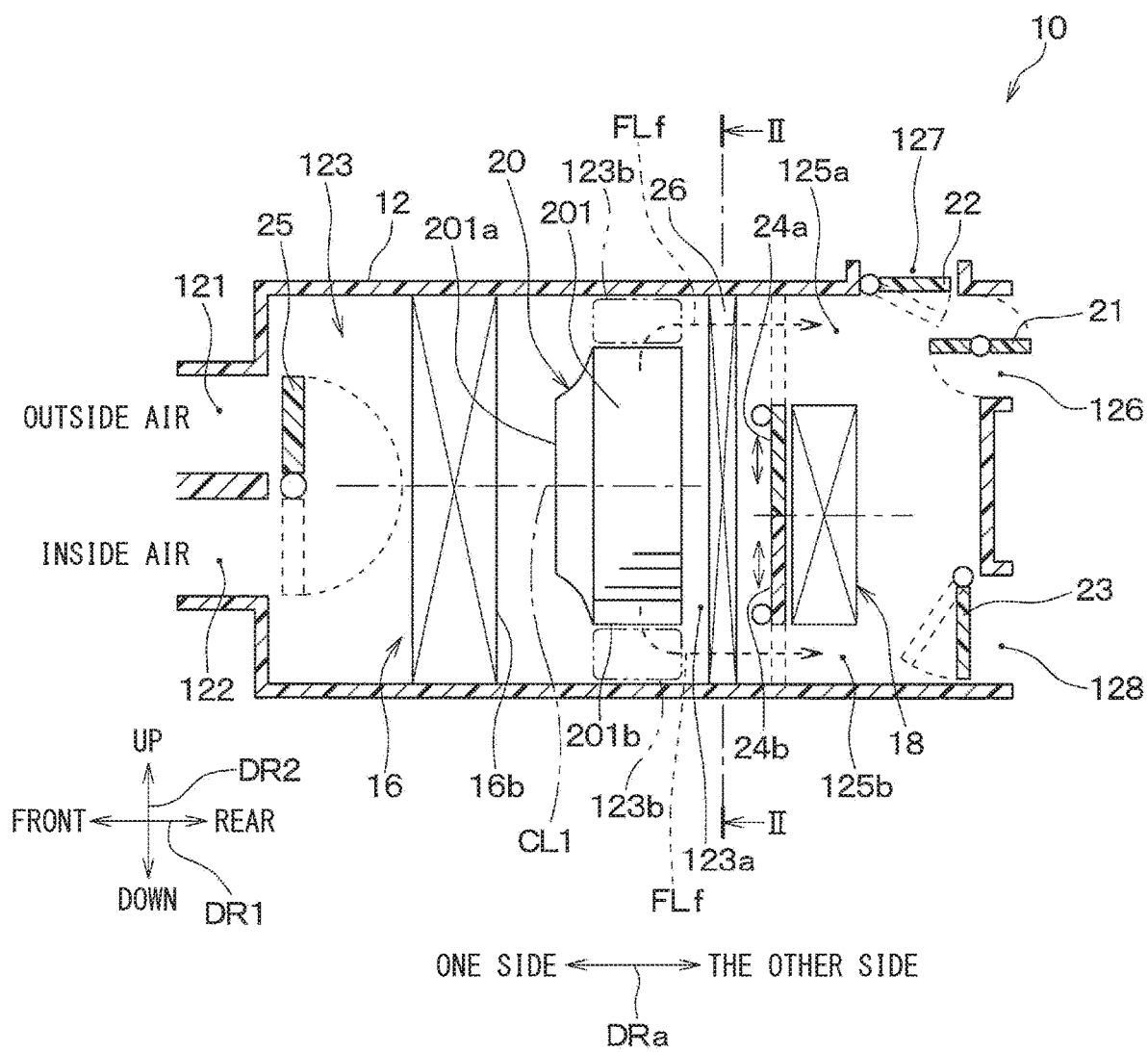
FIG. 1 is a schematic cross-sectional view showing a schematic configuration of an air-conditioning unit for vehicles in a first embodiment.

Hereinafter, each embodiment will be described with reference to the drawings. Note that in each of the following embodiments, portions that are the same as or equivalent to each other are denoted by the same reference numerals in the drawings.

To begin with, in an air-conditioning unit for vehicles, the centrifugal fan is arranged so that the fan axis of the centrifugal fan is in the direction orthogonal to the air flow direction on the air flow downstream side with respect to the centrifugal fan. However, due to various restrictions and the like, it is conceivable that a direction of a blower fan of the blower cannot be the direction described above depending on the air-conditioning unit for vehicles.

Therefore, it is also conceivable that, for example, the blower fan of the blower is arranged in a direction in which the other side of the fan axis, which is a side opposite to one side (specifically, an air suction side) in the axial direction of the fan axis, extends to the air flow downstream side in the in-case passage. In a case where the blower fan is arranged as described above, the air blown out from the blower fan flows to the air flow downstream side of the blower fan while having a swirling flow generated by rotation of the blower fan.

Here, in the air-conditioning unit for vehicles, when the air is blown out, a plurality of blow-out ports are generally opened simultaneously. For example, a plurality of face blow-out ports are formed in the air conditioning case of the air-conditioning unit for vehicles, and in a face mode or the like, the plurality of face blow-out ports are simultaneously opened to blow out the air.

Assuming that the air having the swirling flow reaches the plurality of blow-out ports simultaneously opened as described above and is blown out into a vehicle interior, a deviation may occur in an airflow blown out from the plurality of blow-out ports due to the swirling flow. If so, there is a possibility that an airflow ratio will collapse between the plurality of blow-out ports, such that a deviation also occurs in a temperature of the vehicle interior. That is, there is a possibility that deterioration of air distribution performance and temperature controllability of the air-conditioning unit for vehicles will be caused.

In addition, it is also possible to arrange the plurality of blow-out ports so as to suppress the deviation in the airflow due to the swirling flow between the plurality of blow-out ports, but if it is necessary to arrange the plurality of blow-out ports as described above, an arrangement of the blow-out ports is significantly restricted, which is not preferable. As a result of detailed studies by the inventors, the problems as described above have been found.

The present disclosure has been made in view of the above, and the objective of one aspect of the present disclosure is to provide an air-conditioning unit for vehicles capable of arranging a plurality of blow-out ports without excessively restricting an arrangement of the blow-out ports in order to avoid a deviation in a blown-out airflow caused by a swirling flow by rotation of a blower fan.

One aspect of the present disclosure includes:

an air conditioning case that defines therein an in-case passage through which air flows;

a blower that includes a blower fan rotating about a fan axis and arranged in the in-case passage, the blower blowing out an air drawn from one side in an axial direction of the fan axis by rotation of the blower fan; and a rectifying mechanism that is arranged downstream of the blower fan in an airflow direction in the in-case passage, the air blown by the blower fan passing through the rectifying mechanism, wherein the blower fan has the other side of the fan axis that is opposite to the one side in the axial direction and is arranged so that the other side of the fan axis extends toward a downstream side of the in-case passage, and the rectifying mechanism is configured to suppress a swirling flow generated by the rotation of the blower fan in the air blown out from the blower fan as compared with the blown-out air prior to flowing into the rectifying mechanism.

According to such a configuration, the swirling flow is suppressed on the air flow downstream side with respect to the rectifying mechanism, and thus, it is not necessary to excessively restrict an arrangement of the blow-out ports in consideration of the swirling flow. That is, it becomes possible to arrange the plurality of blow-out ports without excessively restricting the arrangement of the blow-out ports in order to avoid a deviation in a blown-out airflow caused by the swirling flow due to the rotation of the blower fan.

First Embodiment

As shown in FIG. 1, an air-conditioning unit 10 for vehicles according to the present embodiment includes an air conditioning case 12, an evaporator 16, a heater core 18, a blower 20, a plurality of doors 21, 22, 23, 24a, 24b, and 25, and a rectifying mechanism 26. The air-conditioning unit 10 for vehicles is arranged, for example, inside an instrument panel provided at the foremost portion in a vehicle interior. Note that respective arrows DR1, DR2, and DR3 in FIGS. 1 and 2 indicate directions of a vehicle in which the air-conditioning unit 10 for vehicles is mounted. That is, an arrow DR1 in FIG. 1 indicates a front and rear direction DR1 of the vehicle, an arrow DR2 in FIG. 1 indicates an up and down direction DR2 of the vehicle, and an arrow DR3 in FIG. 2 indicates a left and right direction DR3 of the vehicle, that is, a width direction DR3 of the vehicle. These directions DR1, DR2, and DR3 are directions intersecting each other, strictly speaking, directions orthogonal to each other.

The air conditioning case 12 is a member forming an outer shell of the air-conditioning unit 10 for vehicles and formed of a resin. The air conditioning case 12 is formed with an outside air introduction port 121, an inside air introduction port 122, and blow-out ports 126, 127, and 128 blowing out air from the air conditioning case 12. In addition, an in-case passage 123 through which air flows from one or both of the outside air introduction port 121 and the inside air introduction port 122 to the blow-out ports 126, 127, and 128 is formed in the air conditioning case 12. The in-case passage 123 is formed so as to extend in the front and rear direction DR1 of the vehicle.

The outside air introduction port 121 is an introduction port for introducing outside air, which is air outside the vehicle interior, into the in-case passage 123. The inside air introduction port 122 is an introduction port for introducing inside air, which is air inside the vehicle interior, into the in-case passage 123. The outside air or the inside air is introduced into the air conditioning case 12 by the blower 20.

The outside air introduction port 121 and the inside air introduction port 122 are opened and closed by an inside/outside air switching door 25. The air introduced from one or both of the outside air introduction port 121 and the inside air introduction port 122 flows into the evaporator 16.

The evaporator 16 is a cooling heat exchanger that cools the air passing through the evaporator 16. In short, the evaporator 16 is a cooler.

The evaporator 16 is accommodated in the air conditioning case 12. That is, the evaporator 16 is arranged in the in-case passage 123 so that the outside air or the inside air introduced into the in-case passage 123 flows thereinto. The evaporator 16 constitutes a well-known refrigeration cycle apparatus that circulates a refrigerant together with a compressor, a condenser, and an expansion valve (not shown). The evaporator 16 exchanges heat between the air passing through the evaporator 16 and the refrigerant, and evaporates the refrigerant and cools the air by the heat exchange.

The blower 20 has a blower fan 201 that rotates around a fan axis CL1 and is arranged in the in-case passage 123 and a fan motor (not shown) that rotationally drives the blower fan 201. The blower fan 201 is a centrifugal fan in the present embodiment. The blower 20, which is a centrifugal blower, sucks air from one side in an axial direction DRa of the fan axis CL1 by the rotation of the blower fan 201, and blows out the sucked air to the outside in a radial direction of the blower fan 201. The air blown out to the outside in the radial direction is guided to an air flow downstream side (for example, a rear side of the vehicle in FIG. 1) of the in-case passage 123 by the air conditioning case 12 as indicated by an arrow FLf.

In detail, the blower fan 201, which is the centrifugal fan, has a fan air inlet 201a that is provided on one side in the axial direction DRa of the fan axis CL1 and sucks air and a fan air outlet 201b that is provided on an outer peripheral portion of the blower fan 201 and blows out the air. The fan air outlet 201b is formed over the entire circumference of the outer peripheral portion of the blower fan 201. The blower fan 201 sucks air from one side in the axial direction DRa through the fan air inlet 201a by the rotation of the blower fan 201. At the same time, the blower fan 201 blows out the sucked air from the fan air outlet 201b to the outside in the radial direction of the blower fan 201.

For that reason, in the air conditioning case 12, a fan circumferential space 123b which surrounds the blower fan 201 on the outside in the radial direction of the blower fan 201 and into which the air flows from the blower fan 201 is formed as a part of the in-case passage 123. The air conditioning case 12 is configured so as to guide the air flowing from the blower fan 201 into the fan circumferential space 123b to the other side, which is an opposite side to the one side in the axial direction DRa. For example, an air guide wall (not shown) arranged on one side of the axial direction DRa with respect to the fan circumferential space 123b is provided in the air conditioning case 12. The air conditioning case 12 guides the air of the fan circumferential space 123b to flow to the other side while preventing the air of the fan circumferential space 123b from flowing to one side in the axial direction DRa by the air guide wall.

Thus, the air blown out from the blower fan 201 to the outside in the radial direction of the blower fan 201 enters the fan circumferential space 123b as indicated by the arrow FLf, and is guided from the fan circumferential space 123b to the other side in the axial direction DRa with respect to the blower fan 201 by the air conditioning case 12.

Note that the axial direction DRa of the fan axis CL1 coincides with the front and rear direction DR1 of the vehicle in the present embodiment. In addition, the axial direction DRa of the fan axis CL1 is also referred to as a fan axial direction DRa. In addition, the radial direction of the blower fan 201 is a radial direction of the fan axis CL1. The radial direction of the fan axis CL1 is also referred to as a fan radial direction.

The blower 20 has a so-called suction-type layout in which the blower fan 201 is arranged on an air flow downstream side with respect to the evaporator 16. The blower 20 is arranged so that one side in the fan axial direction DRa, which is an air suction side of the blower fan 201, faces an air outflow surface 16b of the evaporator 16. Therefore, the blower fan 201 is arranged in a direction in which the other side of the fan axis CL1, which is an opposite side to one side in the fan axial direction DRa, extends to the air flow downstream side of the in-case passage 123. In other words, the blower fan 201 is arranged so that the other side of the fan axis CL1 faces the direction in which it extends to the air flow downstream side (specifically, a rear side of the vehicle) of the in-case passage 123.

In detail, the blower 20 is arranged so that the fan axis CL1 is substantially orthogonal to the air outflow surface 16b of the evaporator 16. For that reason, the blower fan 201 is arranged so that the other side of the fan axis CL1 extends in a direction (specifically, to the rear side of the vehicle) in which a fan downstream portion 123a, which is a portion on an air flow downstream side of the blower fan 201 in the in-case passage 123, extends. That is, the air flow blown out from the blower fan 201 proceeds to the other side in the fan axial direction DRa in the in-case passage 123.

The heater core 18 is arranged on the air flow downstream side with respect to the blower fan 201 in the in-case passage 123. The heater core 18 is arranged at a center portion in the up and down direction DR2 of the vehicle in the in-case passage 123. The heater core 18 is a heater that heats air passing through the heater core 18, of the air flowing through the in-case passage 123.

In the air conditioning case 12, an upper bypass passage 125a is formed above the heater core 18, and a lower bypass passage 125b is formed below the heater core 18. Both of the upper bypass passage 125a and the lower bypass passage 125b are included in the in-case passage 123 and allow the air to flow in parallel to the heater core 18. That is, both of the upper bypass passage 125a and the lower bypass passage 125b are bypass passages that allow the air to bypass the heater core 18 to flow therethrough. In other words, both of the upper bypass passage 125a and the lower bypass passage 125b are non-heating passages in which the heater core 18 is not provided.

A first air mix door 24a and a second air mix door 24b are provided on an air flow upstream side with respect to the heater core 18 in the in-case passage 123. The first air mix door 24a and the second air mix door 24b are provided on an air flow downstream side with respect to the rectifying mechanism 26.

In terms of positions in the fan axial direction DRa, the air mix doors 24a and 24b are provided on the other side in the fan axial direction DRa with respect to the rectifying mechanism 26. The heater core 18 and the bypass passages 125a and 125b are provided on the other side of the fan axial direction DRa with respect to the air mix doors 24a and 24b.

The first air mix door 24a is arranged in the upper bypass passage 125a and opens and closes the upper bypass passage 125a. The first air mix door 24a is a slide-type door mechanism, and is slid by an electric actuator (not shown).

The first air mix door 24a adjusts an airflow ratio between an airflow passing through the heater core 18 and an airflow passing through the upper bypass passage 125a according to a slide position thereof.

The second air mix door 24b is arranged in the lower bypass passage 125b and opens and closes the lower bypass passage 125b. The second air mix door 24b is a slide-type door mechanism, and is slid by an electric actuator (not shown).

The second air mix door 24b adjusts an airflow ratio between an airflow passing through the heater core 18 and an airflow passing through the lower bypass passage 125b according to a slide position thereof.

In the air conditioning case 12, a face blow-out port 126, a defroster blow-out port 127, and a foot blow-out port 128 for blowing out the air to the outside of the air conditioning case 12 are formed. The face blow-out port 126, the defroster blow-out port 127, and the foot blow-out port 128 are connected to the in-case passage 123 on an air flow downstream side with respect to the heater core 18 and the bypass passages 125a and 125b, respectively.

The air flowing out from the face blow-out port 126 is guided through a duct (not shown), and is blown out toward the face or the chest of an occupant seated on a front seat of the vehicle interior. The air flowing out from the defroster blow-out port 127 is guided through a duct (not shown), and is blown out toward a window glass on a front surface of the vehicle in the vehicle interior. The air flowing out from the foot blow-out port 128 is guided through a duct (not shown), and is blown out toward the feet of the occupant seated on the front seat of the vehicle interior.

In addition, the face blow-out port 126 is provided with a face door 21, and the face door 21 opens and closes the face blow-out port 126. The defroster blow-out port 127 is provided with a defroster door 22, and the defroster door 22 opens and closes the defroster blow-out port 127. The foot blow-out port 128 is provided with a foot door 23, and the foot door 23 opens and closes the foot blow-out port 128.

On an air flow downstream side of the heater core 18 in the in-case passage 123, warm air passing through the heater core 18 and cool air passing through the upper bypass passage 125a are mixed with each other. The mixed air is blown out mainly from an opened blow-out port of the face blow-out port 126 and the defroster blow-out port 127 into the vehicle interior.

In addition, on the air flow downstream side of the heater core 18, warm air passing through the heater core 18 and cool air passing through the lower bypass passage 125b are mixed with each other. The mixed air is blown out mainly from the foot blow-out port 128 into the vehicle interior in a case where the foot blow-out port 128 is opened.

Figure 2:
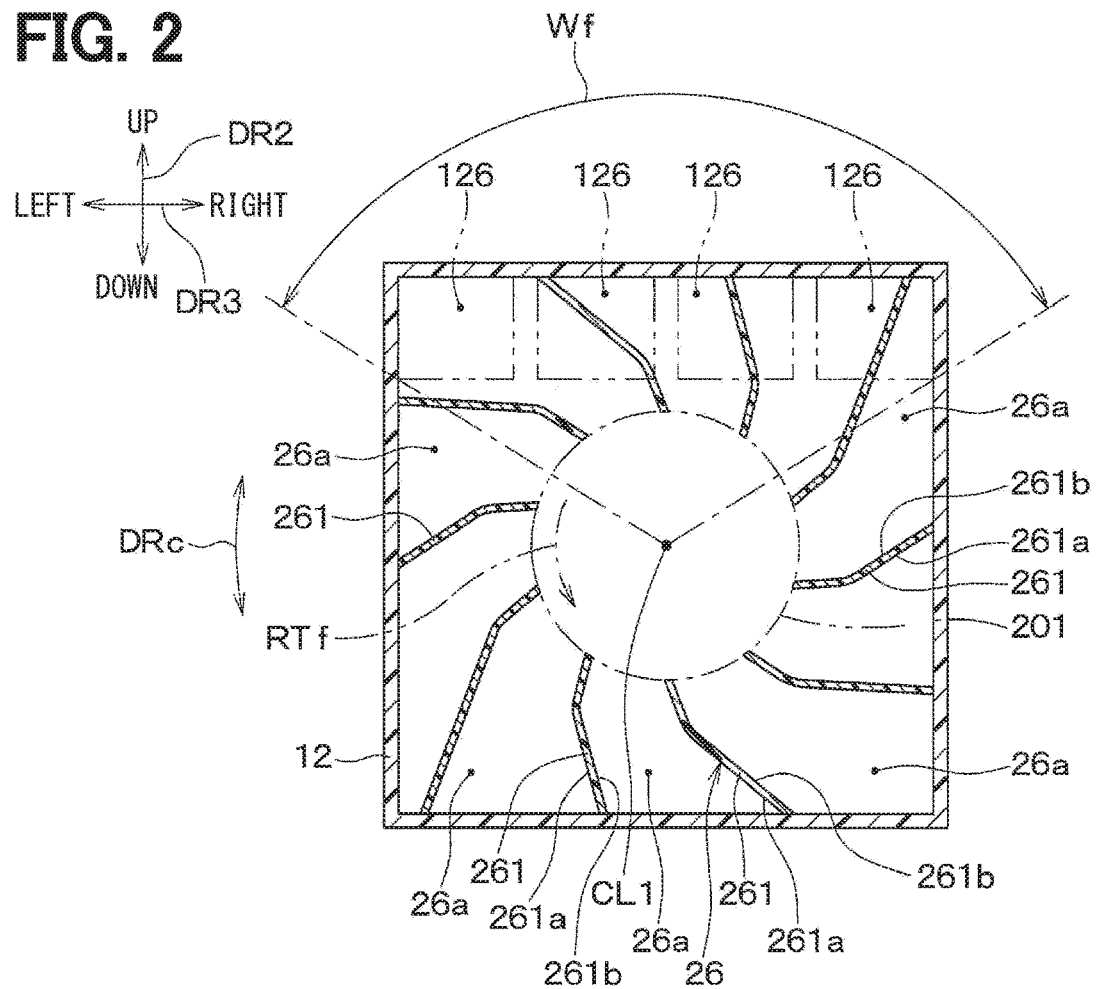
FIG. 2 is a cross-sectional view taken along line II-II in FIG. 1, and is a view showing a schematic shape of a rectifying mechanism of the first embodiment.

As shown in FIGS. 1 and 2, the air conditioning case 12 is provided with a plurality of face blow-out ports 126. For example, in a case where a blow-out mode of the air-conditioning unit 10 for vehicles is set to a face mode, the face blow-out ports 126 are opened, and the defroster blow-out port 127 and the foot blow-out port 128 are closed. Therefore, in this case, the air passing through the rectifying mechanism 26 arranged on an air flow upstream side as compared with the face blow-out ports 126 is distributed and flows into each of the plurality of face blow-out ports 126. The air passing through the rectifying mechanism 26 is not distributed to the closed defroster blow-out port 127 and foot blow-out port 128. That is, the plurality of blow-out ports into which the air passing through the rectifying mechanism 26 is distributed and flows specifically refer to a plurality of blow-out ports simultaneously opened in any one of blow-out modes.

In addition, as shown in FIG. 2, the plurality of face blow-out ports 126 are arranged in only a partial area Wf of the entire circumference around the fan axis CL1 in a circumferential direction DRc of the fan axis CL1. For example, all of the plurality of face blow-out ports 126 are arranged so as to be biased upward as compared with the fan axis CL1. The plurality of face blow-out ports 126 are not arranged on concentric circles centered on the fan axis CL1, but are linearly arranged side by side in the width direction DR3 of the vehicle. Note that the circumferential direction DRc of the fan axis CL1 is also referred to as a fan circumferential direction DRc. In addition, in FIG. 2, in order to show a positional relationship between the plurality of face blow-out ports 126 and the blower fan 201, schematic outer shapes of the plurality of face blow-out ports 126 and the blower fan 201 are indicated by two-dot chain lines, and the same applies to FIGS. 4 and 9 as described later.

In addition, strictly speaking, the fact that the plurality of face blow-out ports 126 are arranged in the partial area Wf means that connecting portions at which the plurality of face blow-out ports 126 are connected to the in-case passage 123 are arranged in the partial area Wf.

As shown in FIGS. 1 and 2, the rectifying mechanism 26 is arranged on the air flow downstream side with respect to the blower fan 201 and is arranged on the air flow upstream side with respect to the heater core 18 and the air mix doors 24a and 24b, in the in-case passage 123. For that reason, the air blown out from the blower fan 201 flows into the rectifying mechanism 26, and the blown-out air passes through the rectifying mechanism 26 and then flows to the bypass passages 125a and 125b or the heater core 18. In addition, in terms of a position in the fan axial direction DRa, the rectifying mechanism 26 is provided on the other side in the fan axial direction DRa with respect to the blower fan 201.

Here, since the blower fan 201 is arranged so that the other side in the fan axial direction DRa faces the air flow downstream side in the in-case passage 123, a swirling flow is generated by the rotation of the blower fan 201, in the air blown out from the blower fan 201 and flowing into the rectifying mechanism 26. The rectifying mechanism 26 suppresses the swirling flow generated by the rotation of the blower fan 201 in the air blown out from the blower fan 201 as compared with that before the blown-out air flows into the rectifying mechanism 26.

If the upper bypass passage 125a is opened, the air passing through the rectifying mechanism 26 flows to the upper bypass passage 125a, and if the lower bypass passage 125b is opened, the air passing through the rectifying mechanism 26 flows to the lower bypass passage 125b. Therefore, if attention is paid to the bypass passages 125a and 125b, the following can be said about the suppression of the swirling flow. That is, the rectifying mechanism 26 suppresses a swirling flow of air flowing through the bypass passages 125a and 125b, of the air blown out from the blower fan 201, as compared with that before the air flowing through the bypass passages 125a and 125b flows into the rectifying mechanism 26.

Figure 3:
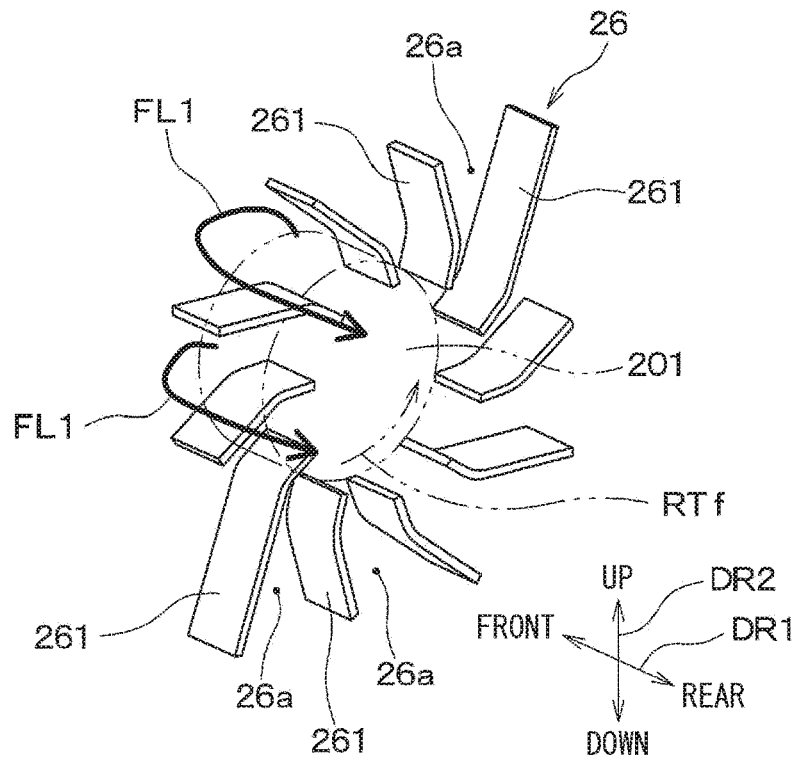
FIG. 3 is a perspective view showing a blower fan by a two-dot chain line and extracting and showing the rectifying mechanism in the first embodiment.

Specifically, as shown in FIGS. 1 to 3, the rectifying mechanism 26 has a plurality of rectifying plates 261 extending from the inside to the outside in the radial direction of the blower fan 201 (that is, the fan radial direction). Each of the plurality of rectifying plates 261 is fixed to the air conditioning case 12. That is, the rectifying mechanism 26 is provided as a non-rotating member that is fixed to the air conditioning case 12 and does not rotate.

The plurality of rectifying plates 261 are arranged with an interval in the fan circumferential direction DRc. Therefore, rectifying passages 26a are formed between the plurality of rectifying plates 261, and each of the rectifying passages 26a can allow the air to flow from the air flow upstream side to the air flow downstream side with respect to the rectifying mechanism 26 in the in-case passage 123. In short, one end and the other end of the rectifying passage 26a in the fan axial direction DRa are opened. Note that a schematic outer shape of the blower fan 201 is indicated by a two-dot chain line in FIG. 3, and the same applies to FIG. 10 as described later.

In addition, as shown in FIGS. 2 and 3, the spaces between the plurality of rectifying plates 261 in the fan circumferential direction DRc gradually increase toward the outside in the fan radial direction. The plurality of rectifying plates 261 may be provided in a simple radial shape, but are not provided in the simple radial shape in the present embodiment. That is, each of the plurality of rectifying plates 261 of the present embodiment gradually extends toward an advance side of a rotation direction RTf of the blower fan 201 from the center to the outside in the fan radial direction.

In addition, each of the plurality of rectifying plates 261 has passage wall surfaces 261a and 261b each of which faces the corresponding rectifying passage 26a on both sides of the rectifying plate 261 in a plate thickness direction. The passage wall surfaces 261a and 261b are formed along the fan axial direction DRa.

Each rectifying plate 261 configured as described above guides the air flowing from the blower fan 201 into the rectifying passage 26a from the air flow upstream side to the air flow downstream side with respect to the rectifying mechanism 26 in the in-case passage 123 along the passage wall surfaces 261a and 261b. In this case, each rectifying plate 261 guides the air flowing through the rectifying passage 26a while resisting against the swirling flow of the air in the fan circumferential direction DRc. Therefore, the rectifying mechanism 26 suppresses the swirling flow of the air blown out from the blower fan 201 by allowing the air blown out from the blower fan 201 to pass through the rectifying passage 26a.

Next, an operation of the air-conditioning unit 10 for vehicles will be described. When the blower 20 starts an operation, the air is introduced into the in-case passage 123 formed in the air conditioning case 12 through the outside air introduction port 121 or the inside air introduction port 122, as shown in FIG. 1. The air introduced into the in-case passage 123 is cooled by the evaporator 16, and passes through the evaporator 16.

The air cooled by the evaporator 16 is sucked into the blower fan 201 of the blower 20, is blown out to the outside in the radial direction of the blower fan 201, and is guided to the air flow downstream side of the in-case passage 123 by the air conditioning case 12.

The air blown out from the blower fan 201 passes through the rectifying mechanism 26. The air passing through the rectifying mechanism 26 becomes warm air when passing through the heater core 18, and flows to the air flow downstream side of the heater core 18, and flows to the air flow downstream side of the heater core 18 with being cold air when flowing through the bypass passages 125a and 125b. Then, the warm air and the cool air are mixed with each other at the air flow downstream side of the heater core 18, and the mixed air is blown out from an opened blow-out port of the face blow-out port 126, the defroster blow-out port 127, and the foot blow-out port 128 to a predetermined place in the vehicle interior.

As described above, according to the present embodiment, as shown in FIGS. 1 to 3, the rectifying mechanism 26 suppresses the swirling flow generated by the rotation of the blower fan 201 in the air blown out from the blower fan 201 as compared with that before the blown-out air flows into the rectifying mechanism 26. Therefore, the swirling flow is suppressed on the air flow downstream side with respect to the rectifying mechanism 26, and thus, it is not necessary to excessively restrict an arrangement of the plurality of face blow-out ports 126 in consideration of the swirling flow. That is, it becomes possible to arrange the plurality of face blow-out ports 126 without excessively restricting the arrangement of the face blow-out ports 126 in order to avoid a deviation in a blown-out airflow caused by the swirling flow due to the rotation of the blower fan 201.

Figure 4:
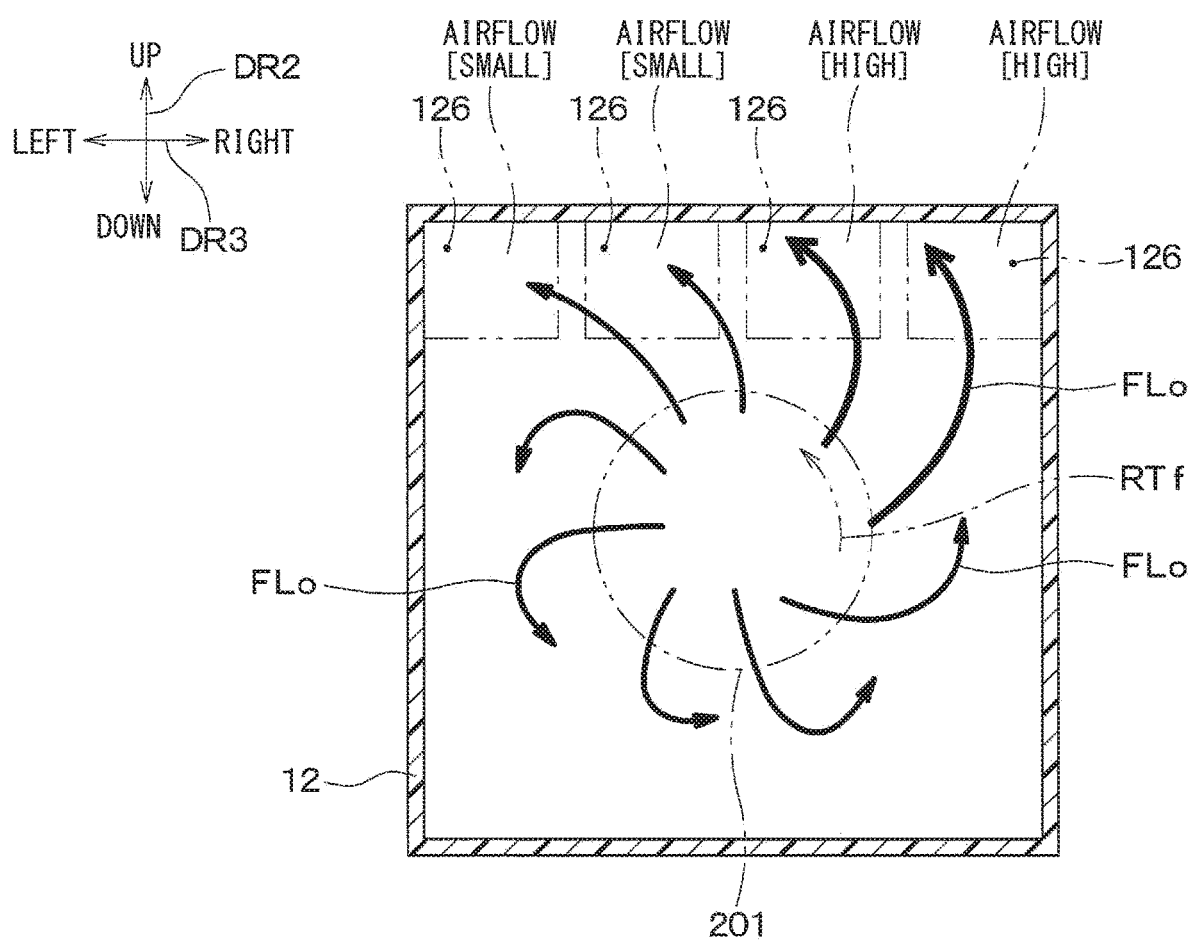
FIG. 4 is a view showing a comparative example in which the rectifying mechanism of the first embodiment is not provided, and is a cross-sectional view corresponding to FIG. 2.

For example, as shown in a comparative example of FIG. 4, if there is no rectifying mechanism 26, the air passing through the bypass passages 125a and 125b arrives at the plurality of face blow-out ports 126 while having the swirling flow generated by the rotation of the blower fan 201. In this case, in the face mode, as a face blow-out port of the plurality of face blow-out ports 126 is positioned closer to the forward direction side in the rotation direction RTf of the blower fan 201, an airflow flowing into the face blow-out port becomes smaller. Therefore, in the comparative example of FIG. 4, a deviation in the blown-out airflow caused by the swirling flow due to the rotation of the blower fan 201 occurs between the plurality of face blow-out ports 126. Note that an arrow FLo in FIG. 4 indicates a flow of the air blown out from the blower fan 201 and having the swirling flow.

On the other hand, in the present embodiment, before the air blown out from the blower fan 201 arrives at the face blow-out ports 126, the swirling flow generated in the blown-out air is suppressed by the rectifying mechanism 26 in advance. Therefore, as shown in FIG. 2, even though the plurality of face blow-out ports 126 are arranged in the partial area Wf of the entire circumference around the fan axis CL1 in the fan circumferential direction DRc, it is possible to prevent the deviation in the blown-out airflow from being generated between the plurality of face blow-out ports 126.

In addition, since a swirl component included in a flow velocity of the air blown out from the blower fan 201 is canceled by the rectifying plates 261 of the rectifying mechanism 26, it is possible to make an air flow uniform on the air flow downstream side of the rectifying mechanism 26. By canceling the swirl component, the air flow is symmetric in a direction orthogonal to the fan axial direction DRa, such that it is possible to make a wind speed distribution uniform. Furthermore, it is possible to improve air distribution performance and temperature controllability at each face blow-out port 126.

In addition, according to the present embodiment, as shown in FIG. 1, the heater core 18 is arranged on the air flow downstream side with respect to the blower fan 201 in the in-case passage 123, and heats the air. The in-case passage 123 includes the bypass passages 125a and 125b that allows the air to bypass the heater core 18 to flow therethrough. The rectifying mechanism 26 suppresses the swirling flow of the air flowing through the bypass passages 125a and 125b, of the air blown out from the blower fan 201, as compared with that before the air flowing through the bypass passages 125a and 125b flows into the rectifying mechanism 26. Therefore, it is possible to cause the rectifying mechanism 26 to effectively exert an action of suppressing the swirling flow with respect to the air flowing through the bypass passages 125a and 125b with small factors that weaken the swirling flow.

In addition, according to the present embodiment, as shown in FIG. 1, the rectifying mechanism 26 is arranged on the air flow upstream side respect to the heater core 18 in the in-case passage 123. Therefore, the air blown out from the blower fan 201 flows into the heater core 18 after the swirling flow is suppressed by the rectifying mechanism 26. For that reason, it is possible to reduce pressure loss when the air flows into the heater core 18.

In addition, according to the present embodiment, as shown in FIGS. 1 to 3, the rectifying mechanism 26 has the plurality of rectifying plates 261 extending from the inside to the outside in the fan radial direction. The rectifying passages 26a that can allow the air to flow from the air flow upstream side to the air flow downstream side with respect to the rectifying mechanism 26 in the in-case passage 123 are formed between the plurality of rectifying plates 261. The interval between the plurality of rectifying plates 261 becomes wide toward the outside in the fan radial direction. The rectifying mechanism 26 suppresses the swirling flow by allowing the air blown out from the blower fan 201 to pass through the rectifying passages 26a.

Here, the air from the blower fan 201 flows into the rectifying passages 26a, but the air flowing into the rectifying passages 26a flows to the air flow downstream side while moving to the outside in the fan radial direction in the rectifying passages 26a. Therefore, in the rectifying passages 26a, even though a flow rate of the air flowing through the rectifying passages 26a is maintained, a flow velocity of the air is decreased according to an increase in the interval between the plurality of rectifying plates 261. The swirling flow is suppressed in accordance with the decrease in the flow velocity. For that reason, it is possible to reduce the pressure loss due to the suppression of the swirling flow.

In addition, according to the present embodiment, as shown in FIGS. 2 and 3, each of the plurality of rectifying plates 261 is formed so as to be positioned on the forward direction side in the rotation direction RTf of the blower fan 201 toward the outside in the fan radial direction. Therefore, for example, as compared with a case where each rectifying plate 261 extends straightly along the radial direction of the blower fan 201, it is possible to reduce the pressure loss caused by the suppression of the swirling flow. The reason is that as the air including the swirling flow moves to the outside in the fan radial direction, it is possible to gently turn a flow direction of the air toward the air flow downstream side of the in-case passage 123.

In addition, according to the present embodiment, as shown in FIGS. 2 and 3, the rectifying plate 261 has the passage wall surfaces 261a and 261b facing the rectifying passage 26a, and the passage wall surfaces 261a and 261b are formed along the fan axial direction DRa. Therefore, it is possible to guide the air flow in a direction along the fan axial direction DRa as indicated by arrows FL1 in FIG. 3 while suppressing the swirling flow generated by the rotation of the blower fan 201.

Second Embodiment

Next, a second embodiment will be described. In the present embodiment, portions different from those of the first embodiment described above will be mainly described. In addition, a description for the same or equivalent parts as those of the embodiment described above will be omitted or simplified. The same applies to a description of embodiments as described later.

Figure 5:
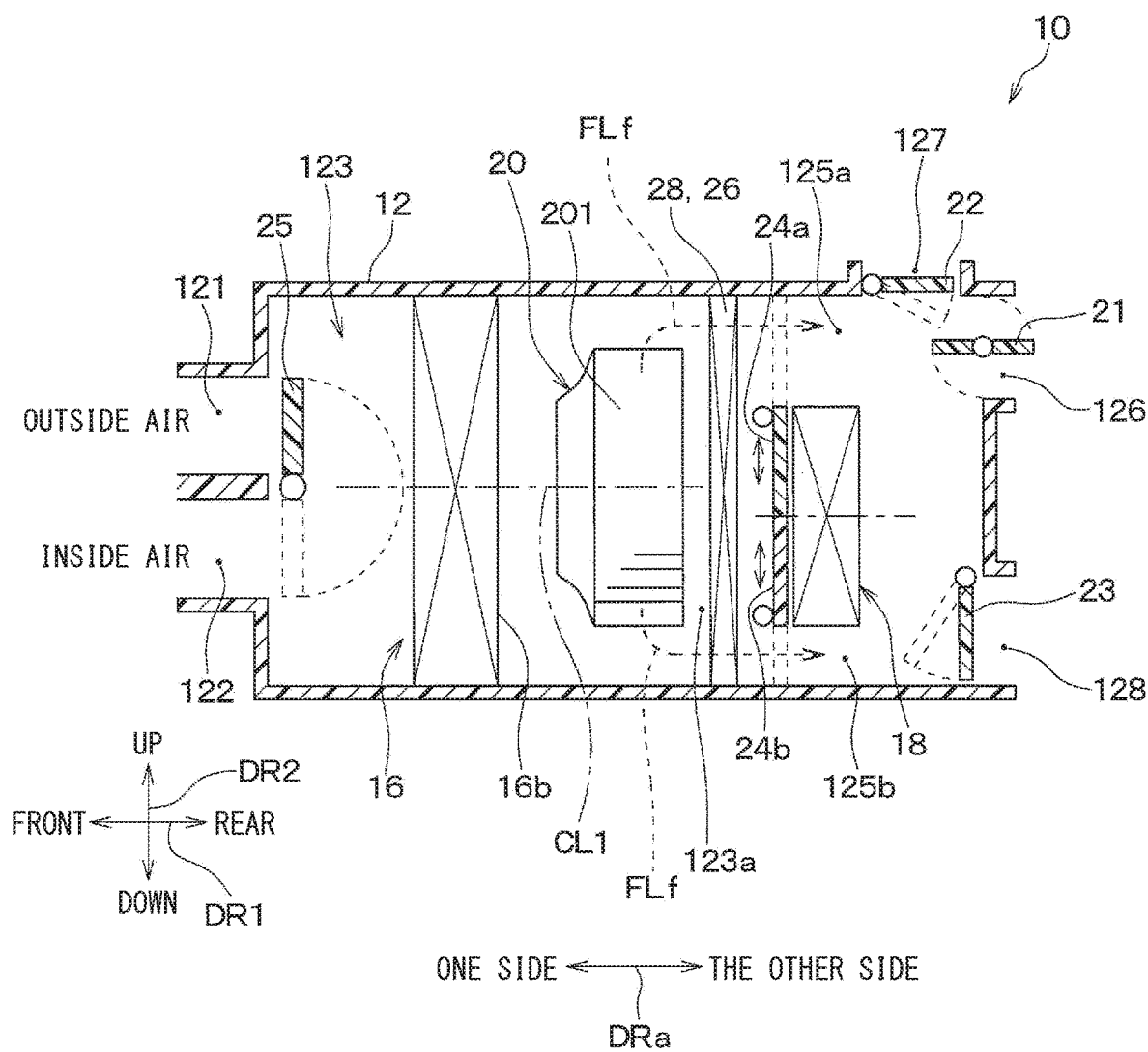
FIG. 5 is a schematic cross-sectional view showing a schematic configuration of an air-conditioning unit for vehicles in a second embodiment, and is a view corresponding to FIG. 1.

As shown in FIG. 5, an air-conditioning unit 10 for vehicles according to the present embodiment includes a filter 28 filtering air blown out from a blower fan 201. In the present embodiment, instead of the rectifying mechanism 26 having the plurality of rectifying plates 261 shown in FIG. 2, the filter 28 is provided as the rectifying mechanism 26.

Therefore, similar to the rectifying mechanism 26 according to the first embodiment, the filter 28 of the present embodiment suppresses a swirling flow generated by rotation of the blower fan 201 in the air blown out from the blower fan 201 as compared with that before the blown-out air flows into the filter 28.

In addition, similar to the rectifying mechanism 26 of the first embodiment, the filter 28 is arranged on an air flow downstream side with respect to the blower fan 201 in an in-case passage 123. The filter 28 is arranged on an air flow upstream side with respect to bypass passages 125a and 125b, a heater core 18, and air mix doors 24a and 24b.

The filter 28 of the present embodiment is composed of, for example, a net or a nonwoven fabric.

The present embodiment is the same as the first embodiment except for those described above. In the present embodiment, effects achieved from a configuration common to the first embodiment described above can be obtained, similar to the first embodiment.

In addition, according to the present embodiment, the filter 28 filtering the air blown out from the blower fan 201 is provided as the rectifying mechanism 26. Therefore, it is possible to reduce the number of components by using the filter 28 included in the air-conditioning unit 10 for vehicles as the rectifying mechanism 26.

Third Embodiment

Next, a third embodiment will be described. In the present embodiment, portions different from those of the first embodiment described above will be mainly described.

Figure 6:
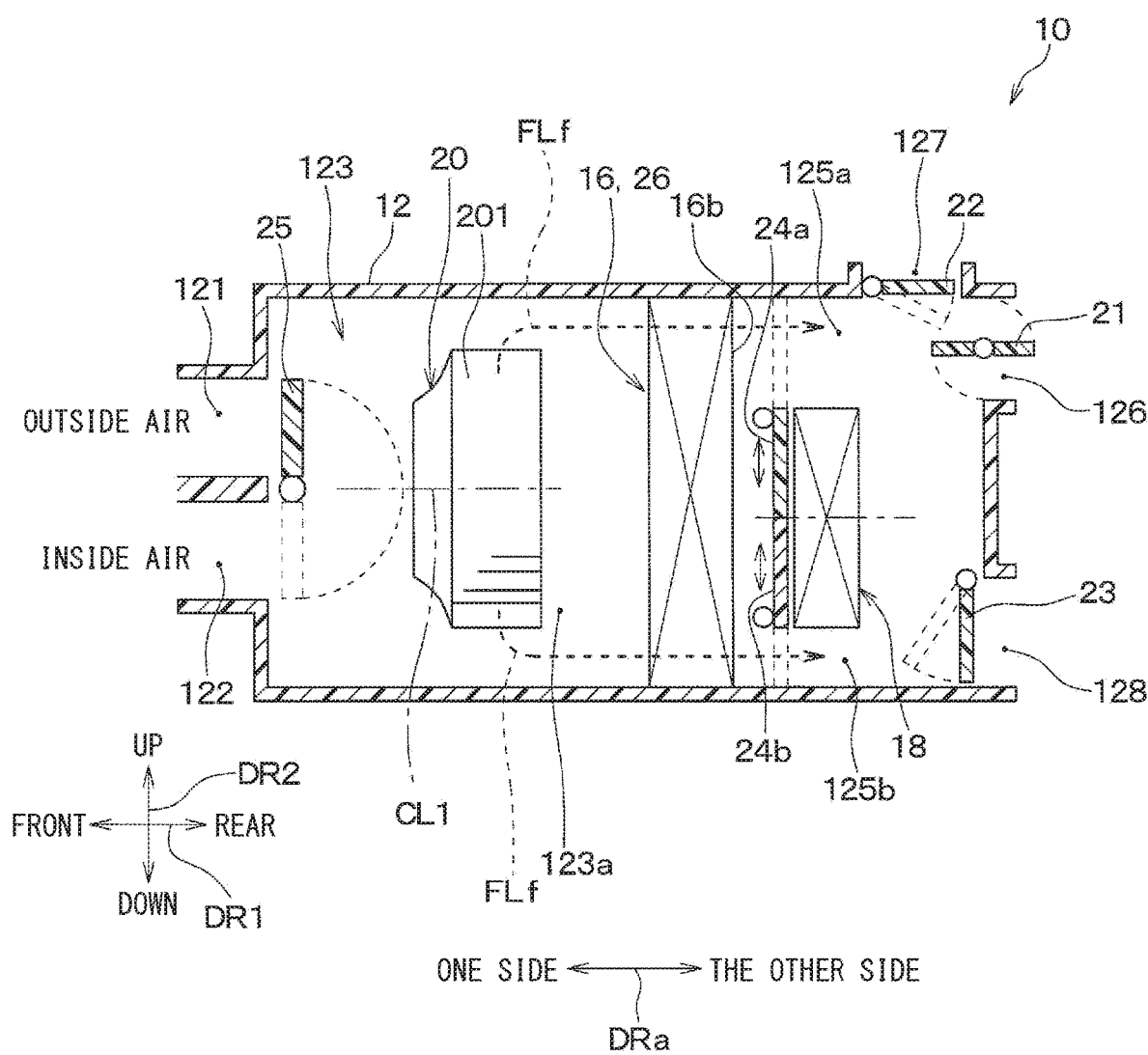
FIG. 6 is a schematic cross-sectional view showing a schematic configuration of an air-conditioning unit for vehicles in a third embodiment, and is a view corresponding to FIG. 1.

As shown in FIG. 6, in an air-conditioning unit 10 for vehicles according to the present embodiment, an arrangement order of an evaporator 16 and a blower 20 is changed in an in-case passage 123. Thus, in the present embodiment, instead of the rectifying mechanism 26 having the plurality of rectifying plates 261 shown in FIG. 2, the evaporator 16 is provided as the rectifying mechanism 26.

Therefore, the evaporator 16 of the present embodiment is arranged on an air flow downstream side with respect to a blower fan 201 in the in-case passage 123, similar to the rectifying mechanism 26 of the first embodiment. The evaporator 16 is arranged on an air flow upstream side with respect to bypass passages 125a and 125b, a heater core 18, and air mix doors 24a and 24b.

With this arrangement, the evaporator 16 suppresses a swirling flow generated by rotation of the blower fan 201 in air blown out from the blower fan 201 as compared with that before the blown-out air flows into the evaporator 16, similar to the rectifying mechanism 26 of the first embodiment.

Figure 7:
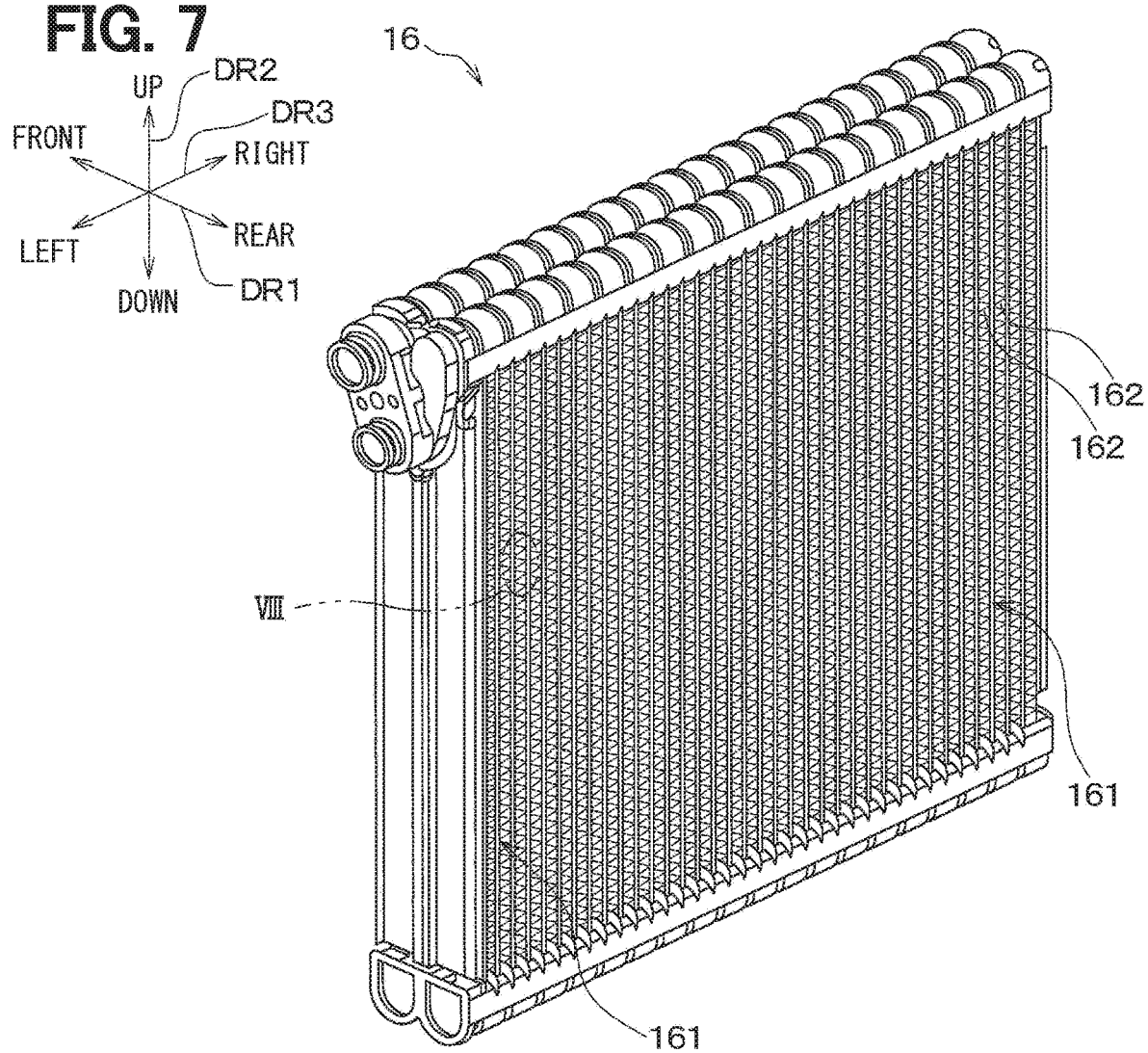
FIG. 7 is a perspective view showing a schematic shape of an evaporator included in the air-conditioning unit for vehicles as a single unit in the third embodiment.
Figure 8:
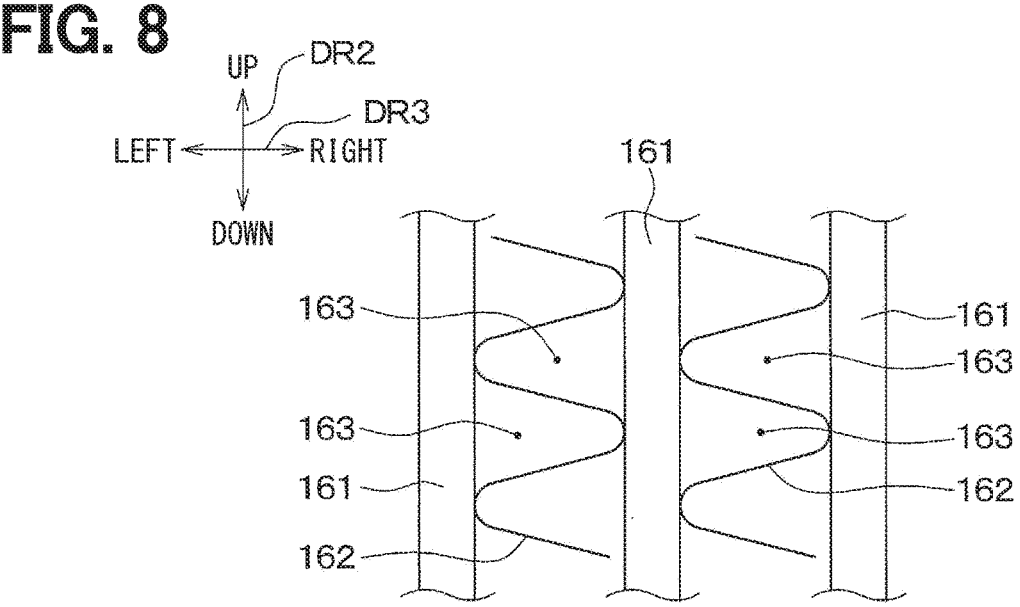
FIG. 8 is an enlarged view of part VIII in FIG. 7 when viewed from a rear side of a vehicle.

Specifically, as shown in FIGS. 6 to 8, the evaporator 16 has a plurality of refrigerant tubes 161 through which a refrigerant for cooling the air flows, and a plurality of corrugated fins 162 arranged between the refrigerant tubes 161. The plurality of refrigerant tubes 161 and the plurality of corrugated fins 162 are arranged to be alternately stacked. For example, the plurality of refrigerant tubes 161 and the plurality of corrugated fins 162 are arranged to be stacked in a width direction DR3 of the vehicle. With this stacked arrangement, a plurality of heat exchange passages 163 penetrating in a fan axial direction DRa are formed in the evaporator 16.

Therefore, in the evaporator 16, the air blown out from the blower fan 201 passes through the plurality of heat exchange passages 163. The evaporator 16 cools the air passing through the plurality of heat exchange passages 163 by the refrigerant in the refrigerant tubes 161.

Since each of the plurality of heat exchange passages 163 is a passage penetrating and sub-divided in the fan axial direction DRa, the air blown out from the blower fan 201 passes through the heat exchange passages 163, such that the swirling flow is suppressed.

The present embodiment is the same as the first embodiment except for those described above. In the present embodiment, effects achieved from a configuration common to the first embodiment described above can be obtained, similar to the first embodiment.

In addition, according to the present embodiment, the evaporator 16 in which the plurality of heat exchange passages 163 through which the air blown out from the blower fan 201 passes are formed and which cools the air passing through the plurality of heat exchange passages 163 is provided as the rectifying mechanism 26. Therefore, it is possible to reduce the number of components by using the evaporator 16 included in the air-conditioning unit 10 for vehicles as the rectifying mechanism 26.

Fourth Embodiment

Next, a fourth embodiment will be described. In the present embodiment, portions different from those of the first embodiment described above will be mainly described.

Figure 9:
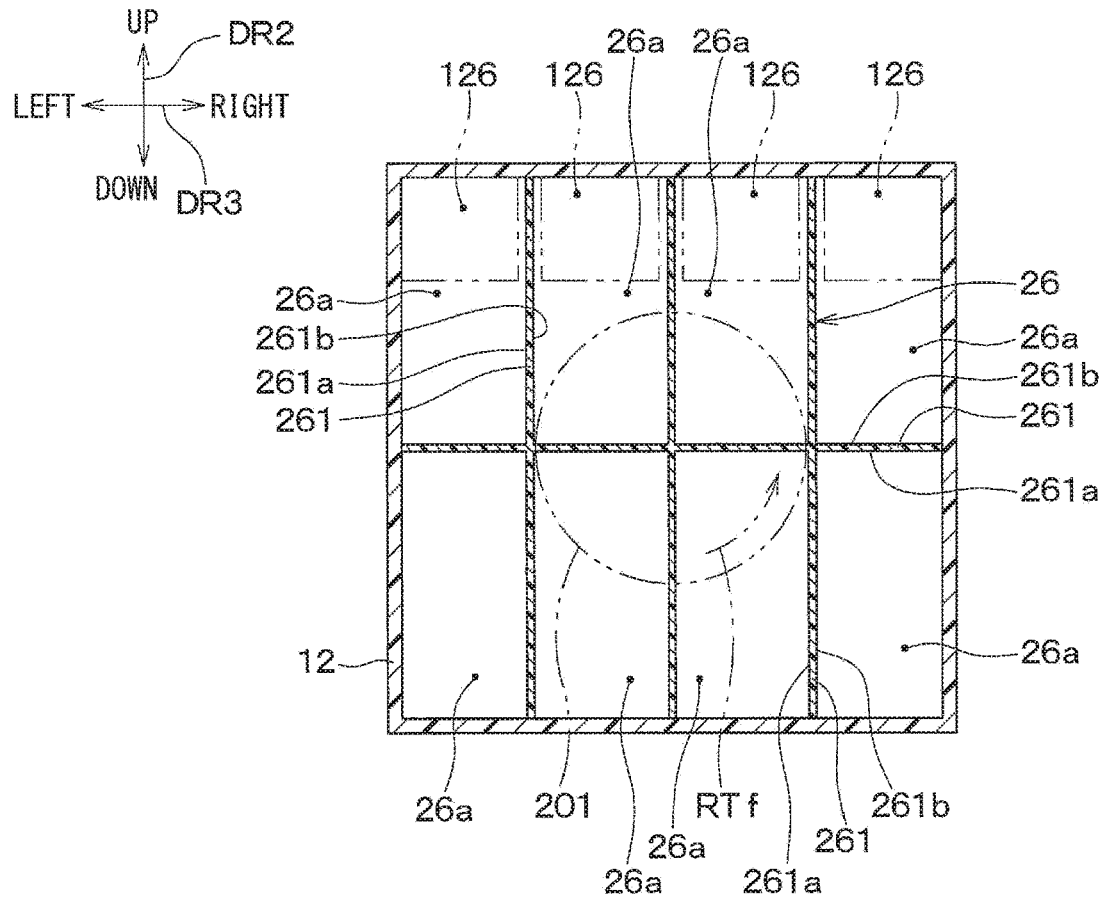
FIG. 9 is a view showing a schematic shape of a rectifying mechanism of a fourth embodiment, and is a cross-sectional view corresponding to FIG. 2.
Figure 10:
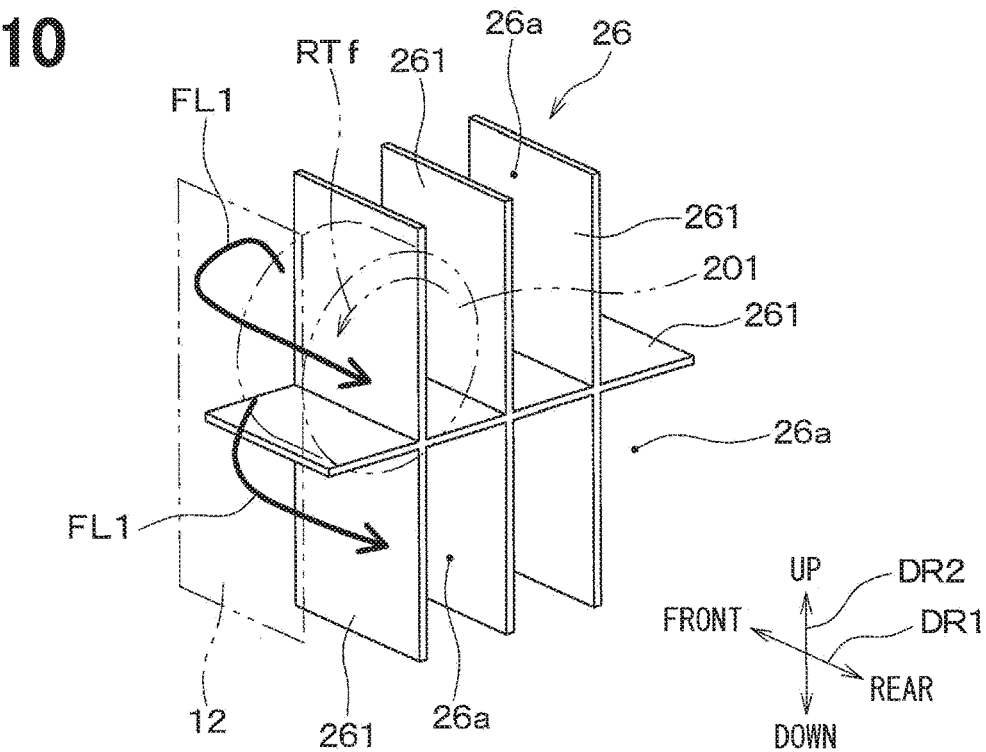
FIG. 10 is a perspective view showing a blower fan by a two-dot chain line and extracting and showing the rectifying mechanism in the fourth embodiment, and is a view corresponding to FIG. 3.

As shown in FIGS. 9 and 10, in an air-conditioning unit 10 for vehicles according to the present embodiment, a rectifying mechanism 26 has a plurality of rectifying plates 261, similar to the first embodiment, and is fixed to an air conditioning case 12. However, in the present embodiment, a shape of the rectifying mechanism 26 is different from that of the first embodiment.

Specifically, in the present embodiment, each of the plurality of rectifying plates 261 has a linearly extending rib shape. The plurality of rectifying plates 261 are connected to each other to form a lattice shape as a whole. For that reason, the plurality of rectifying plates 261 partition and form a plurality of rectifying passages 26a. For example, the plurality of rectifying passages 26a are provided side by side in an up and down direction DR2 of the vehicle, and are also provided side by side in a width direction DR3 of the vehicle.

Each of the rectifying passages 26a is configured so that air can flow from an air flow upstream side to an air flow downstream side with respect to the rectifying mechanism 26 in an in-case passage 123. In short, one end and the other end of the rectifying passage 26a in the fan axial direction DRa are opened.

Note that each of the plurality of rectifying plates 261 has passage wall surfaces 261a and 261b facing the rectifying passage 26a on both sides of the rectifying plate 261 in a plate thickness direction, similar to the first embodiment. The passage wall surfaces 261a and 261b are formed along the fan axial direction DRa.

With such a configuration, the rectifying mechanism 26 suppresses the swirling flow by allowing air blown out from a blower fan 201 to pass through the rectifying passages 26a as indicated by arrows FL1 in FIG. 10. Therefore, in the present embodiment, it is possible to suppress the swirling flow by simplifying a structure of the rectifying mechanism 26.

The present embodiment is the same as the first embodiment except for those described above. In the present embodiment, effects achieved from a configuration common to the first embodiment described above can be obtained, similar to the first embodiment.

Fifth Embodiment

Next, a fifth embodiment will be described. In the present embodiment, portions different from those of the first embodiment described above will be mainly described.

Figure 11:
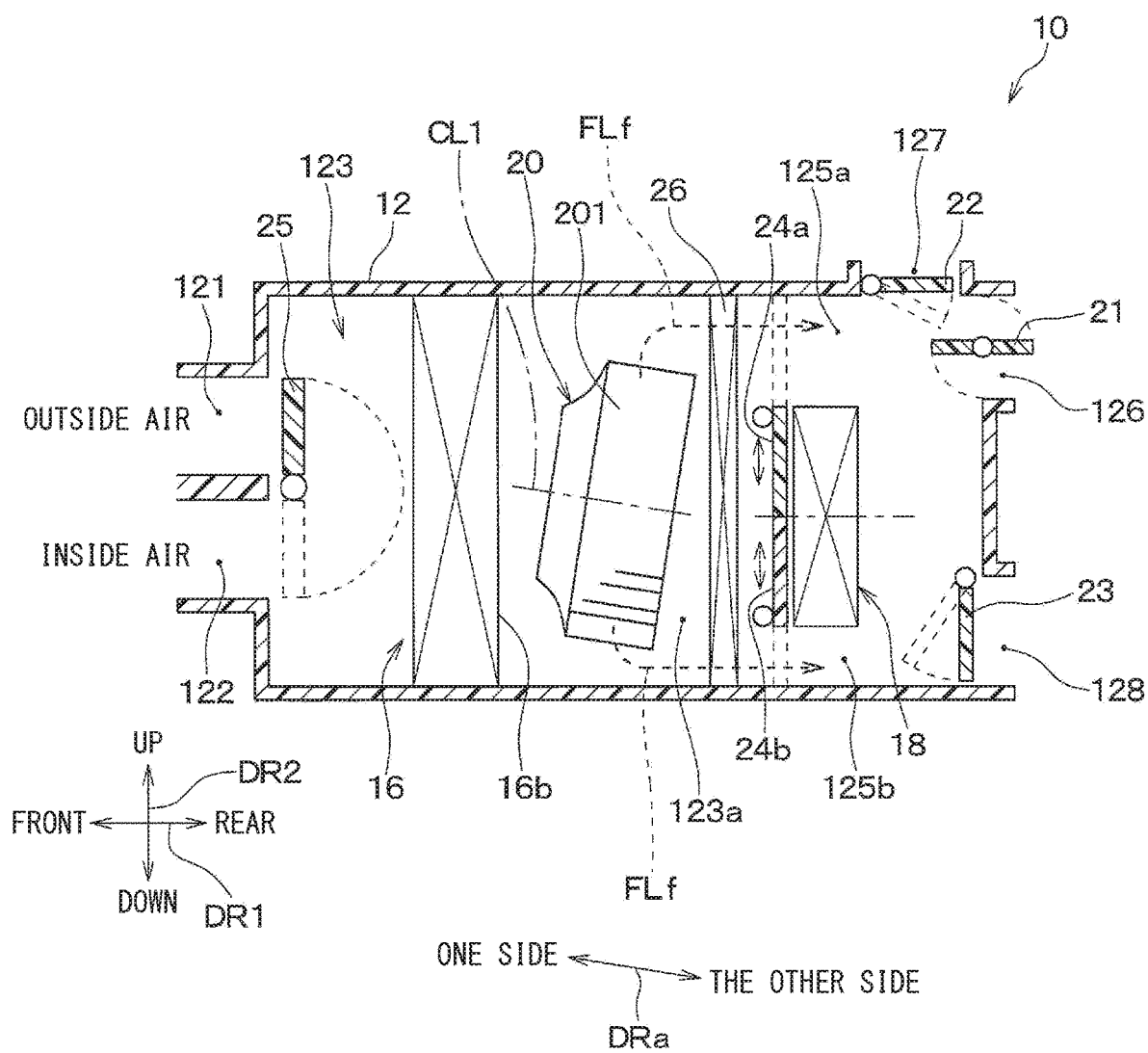
FIG. 11 is a schematic cross-sectional view showing a schematic configuration of an air-conditioning unit for vehicles in a fifth embodiment, and is a view corresponding to FIG. 1.

As shown in FIG. 11, in an air-conditioning unit 10 for vehicles according to the present embodiment, a fan axis CL1 is inclined with respect to a front and rear direction DR1 of the vehicle, and thus, a fan axial direction DRa does not coincide with the front and rear direction DR1 of the vehicle. In this respect, the present embodiment is different from the first embodiment.

Note that the fan axis CL1 is inclined with respect to the front and rear direction DR1 of the vehicle as described above, but a blower fan 201 of the present embodiment is arranged in a direction in which the other side of the fan axis CL1 extends to an air flow downstream side in an in-case passage 123. In this respect, the present embodiment is the same as the first embodiment.

The present embodiment is the same as the first embodiment except for those described above. In the present embodiment, effects achieved from a configuration common to the first embodiment described above can be obtained, similar to the first embodiment.

Note that the present embodiment is a modification based on the first embodiment, but it is possible to combine the present embodiment with any of the second, third, and fourth embodiments described above.

Sixth Embodiment

Next, a sixth embodiment will be described. In the present embodiment, portions different from those of the first embodiment described above will be mainly described.

Figure 12:
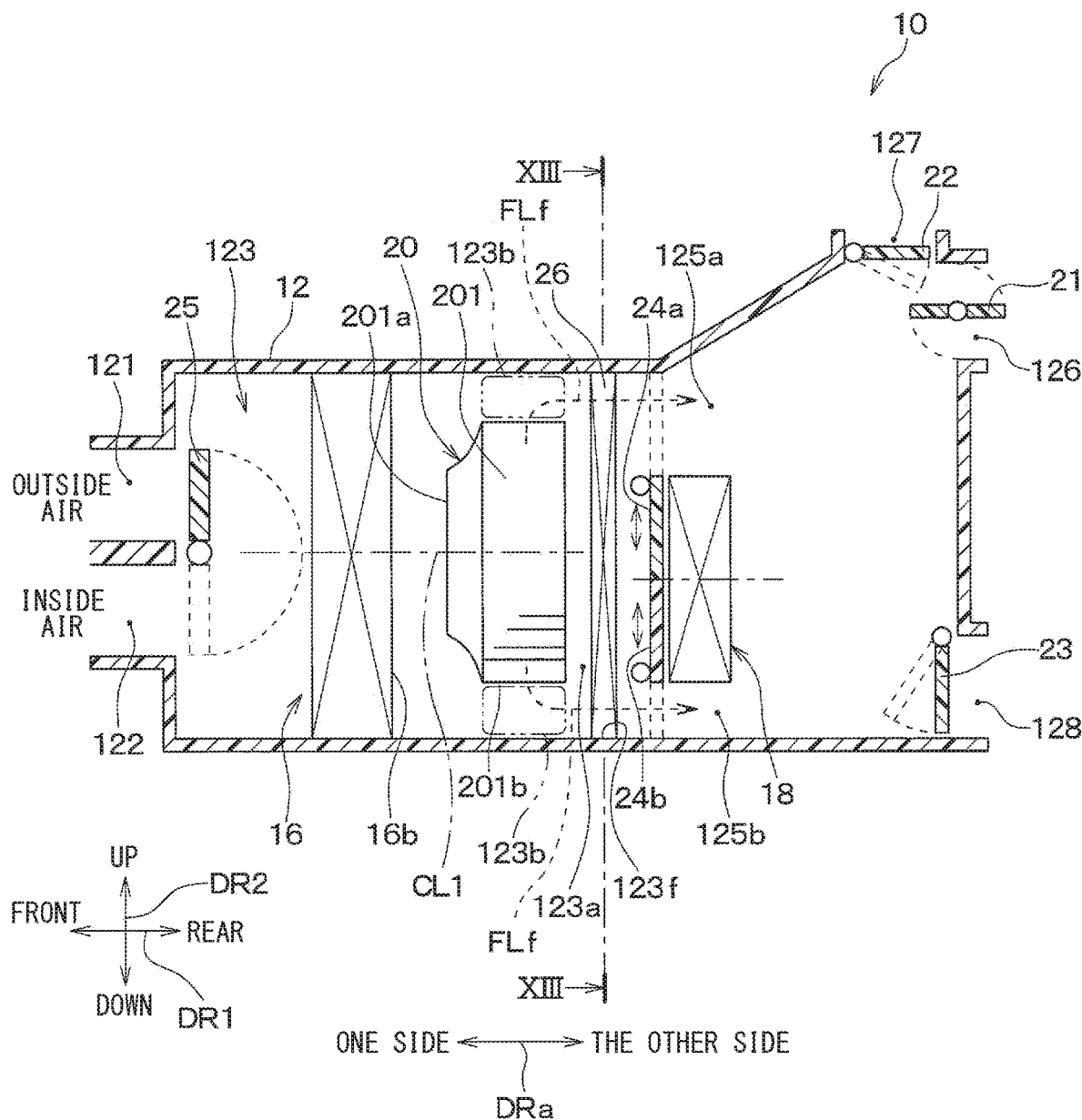
FIG. 12 is a schematic cross-sectional view showing a schematic configuration of an air-conditioning unit for vehicles in a sixth embodiment, and is a cross-sectional view corresponding to FIG. 1.

As shown in FIG. 12, in an air-conditioning unit 10 for vehicles according to the present embodiment, a face blow-out port 126 and a defroster blow-out port 127 are provided so as to be shifted upward as compared with the first embodiment. In addition, as shown in FIGS. 13 and 14, in the present embodiment, a structure of a rectifying mechanism 26 is different from that of the first embodiment.

Figure 13:
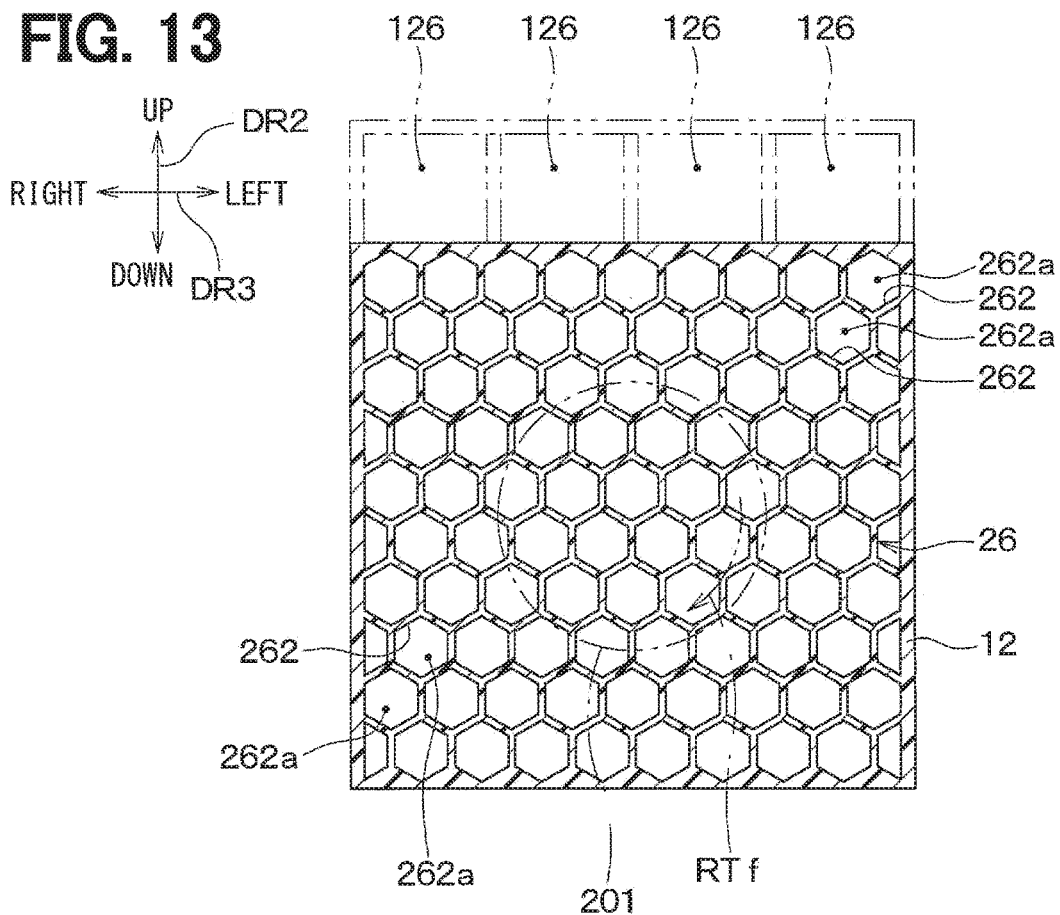
FIG. 13 is a cross-sectional view showing a schematic shape of a rectifying mechanism of the sixth embodiment and taken along line XIII-XIII in FIG. 12, and is a cross-sectional view corresponding to FIG. 2.

Note that, in FIG. 13, in order to show a positional relationship between a plurality of face blow-out ports 126 and a blower fan 201, schematic outer shapes of the plurality of face blow-out ports 126 and the blower fan 201 are indicated by two-dot chain lines. The same applies to FIGS. 15, 19, 20, and 21 as described later.

Figure 14:
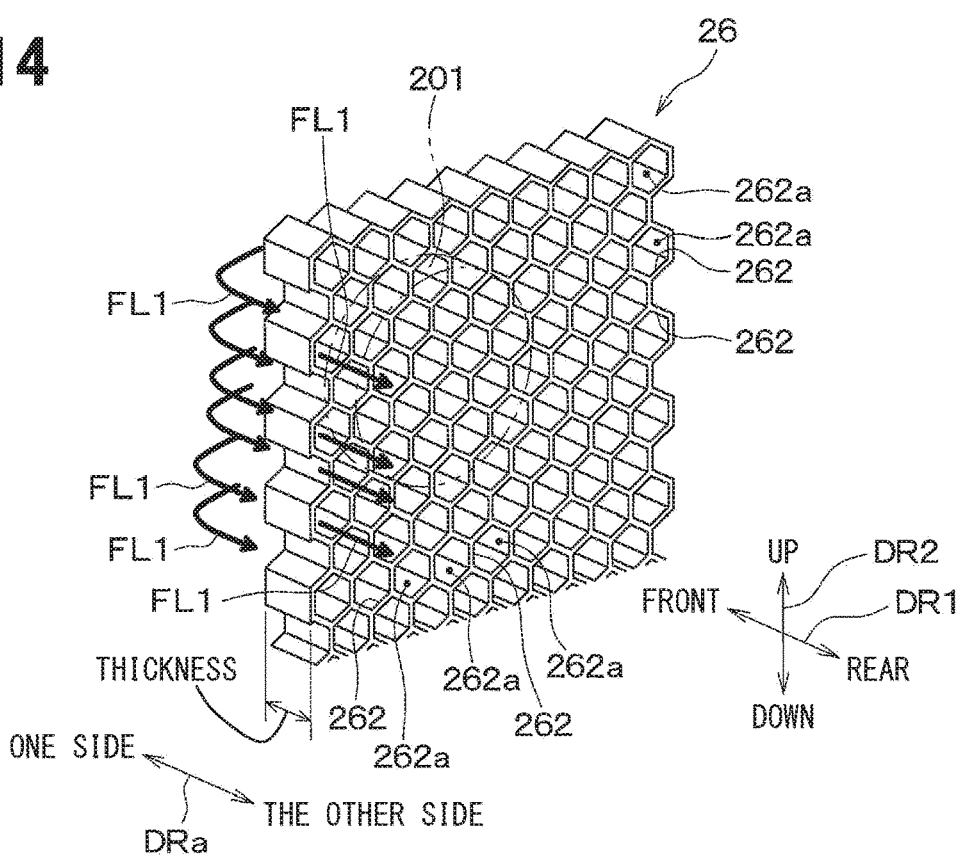
FIG. 14 is a perspective view showing a blower fan by a two-dot chain line and extracting and showing the rectifying mechanism in the sixth embodiment.

Specifically, as shown in FIGS. 13 and 14, in the present embodiment, the rectifying mechanism 26 has a plurality of tubular portions 262 in a direction along a fan axial direction DRa. Since each of the tubular portions 262 has a tubular shape, a through-hole 262a extending in the fan axial direction DRa is defined in each of the tubular portions 262.

The plurality of tubular portions 262 are provided so that the respective through-holes 262a are arranged in parallel with each other. The rectifying mechanism 26 is formed by arranging the neighboring tubular portions 262 integrally with each other.

In detail, the respective through-holes 262a of the tubular portions 262 have the same size. Each of the through-holes 262a is a hexagonal hole whose cross section orthogonal to the fan axial direction DRa has a hexagonal shape. Therefore, the rectifying mechanism 26 of the present embodiment is formed of a honeycomb-shaped porous material. Since the plurality of tubular portions 262 are two-dimensionally arranged in a direction orthogonal to the fan axial direction DRa, the rectifying mechanism 26 is formed so as to have a plate shape with the fan axial direction DRa as a thickness direction. The rectifying mechanism 26 is formed so as to expand over the entire in-case passage 123 in a cross section orthogonal to the fan axial direction DRa. A peripheral edge portion of the rectifying mechanism 26 is joined to an air conditioning case 12.

The rectifying mechanism 26 configured as described above suppresses the swirling flow by allowing air blown out from a blower fan 201 to pass through the plurality of through-holes 262a as indicated by arrows FL1 in FIG. 14. Therefore, it is possible to shorten a distance necessary for rectification of an air flow while ensuring a good rectification property in rectifying the air flow by suppressing the swirling flow. For that reason, it is possible to reduce a thickness of the rectifying mechanism 26 in an air flow direction.

In addition, according to the present embodiment, the through-hole 262a of the tubular portion 262 is a hole whose cross section orthogonal to the fan axial direction DRa has the hexagonal shape. In short, the rectifying mechanism 26 of the present embodiment is formed of the honeycomb-shaped porous material. Therefore, it is easy to densely arrange the plurality of tubular portions 262 in which the through-holes 262a are formed, and it is possible to increase rigidity of the air conditioning case 12 by the rectifying mechanism 26.

The present embodiment is the same as the first embodiment except for those described above. In the present embodiment, effects achieved from a configuration common to the first embodiment described above can be obtained, similar to the first embodiment.

Note that the present embodiment is a modification based on the first embodiment, but it is possible to combine the present embodiment with the fifth embodiment described above.

Seventh Embodiment

Next, a seventh embodiment will be described. In the present embodiment, portions different from those of the sixth embodiment described above will be mainly described.

Figure 15:
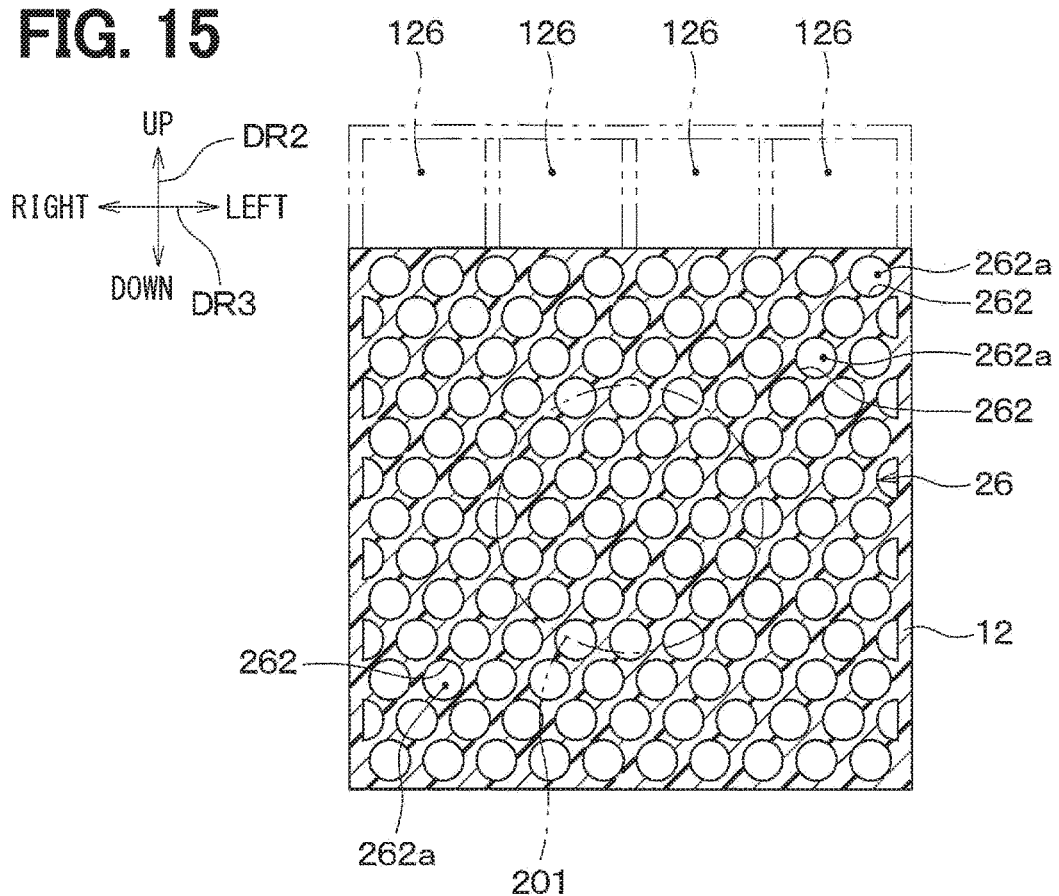
FIG. 15 is a cross-sectional view showing a schematic shape of a rectifying mechanism of a seventh embodiment and taken along line XIII-XIII in FIG. 12, and is a cross-sectional view corresponding to FIG. 13.
Figure 16:
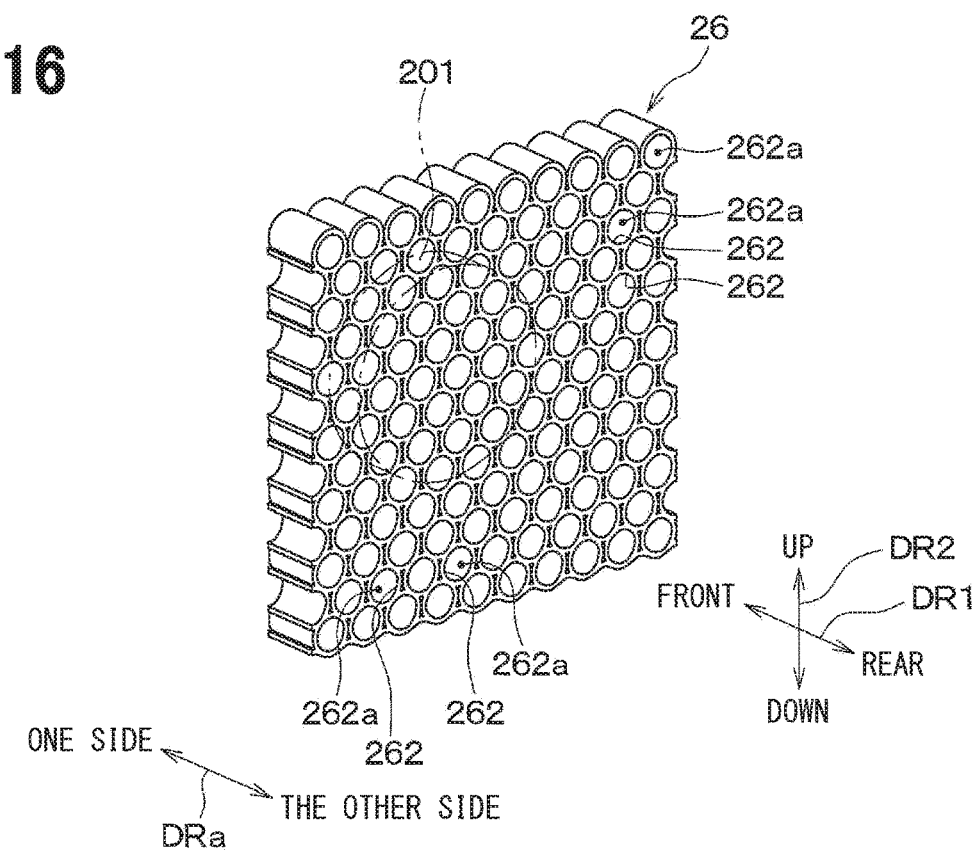
FIG. 16 is a perspective view showing a blower fan by a two-dot chain line and extracting and showing the rectifying mechanism in the seventh embodiment, and is a view corresponding to FIG. 14.

As shown in FIGS. 15 and 16, in the present embodiment, the through-holes 262a formed in each of the plurality of tubular portions 262 are circular holes whose cross section orthogonal to the fan axial direction DRa has a circular shape. The present embodiment is the same as the sixth embodiment except for that described above. In the present embodiment, effects achieved from a configuration common to the sixth embodiment described above can be obtained, similar to the sixth embodiment. Note that the air-conditioning unit 10 for vehicles according to the present embodiment is shown in FIG. 12, and the same applies to eighth to fourteenth embodiments as described later.

Eighth Embodiment

Next, an eighth embodiment will be described. In the present embodiment, portions different from those of the sixth embodiment described above will be mainly described.

Figure 17:
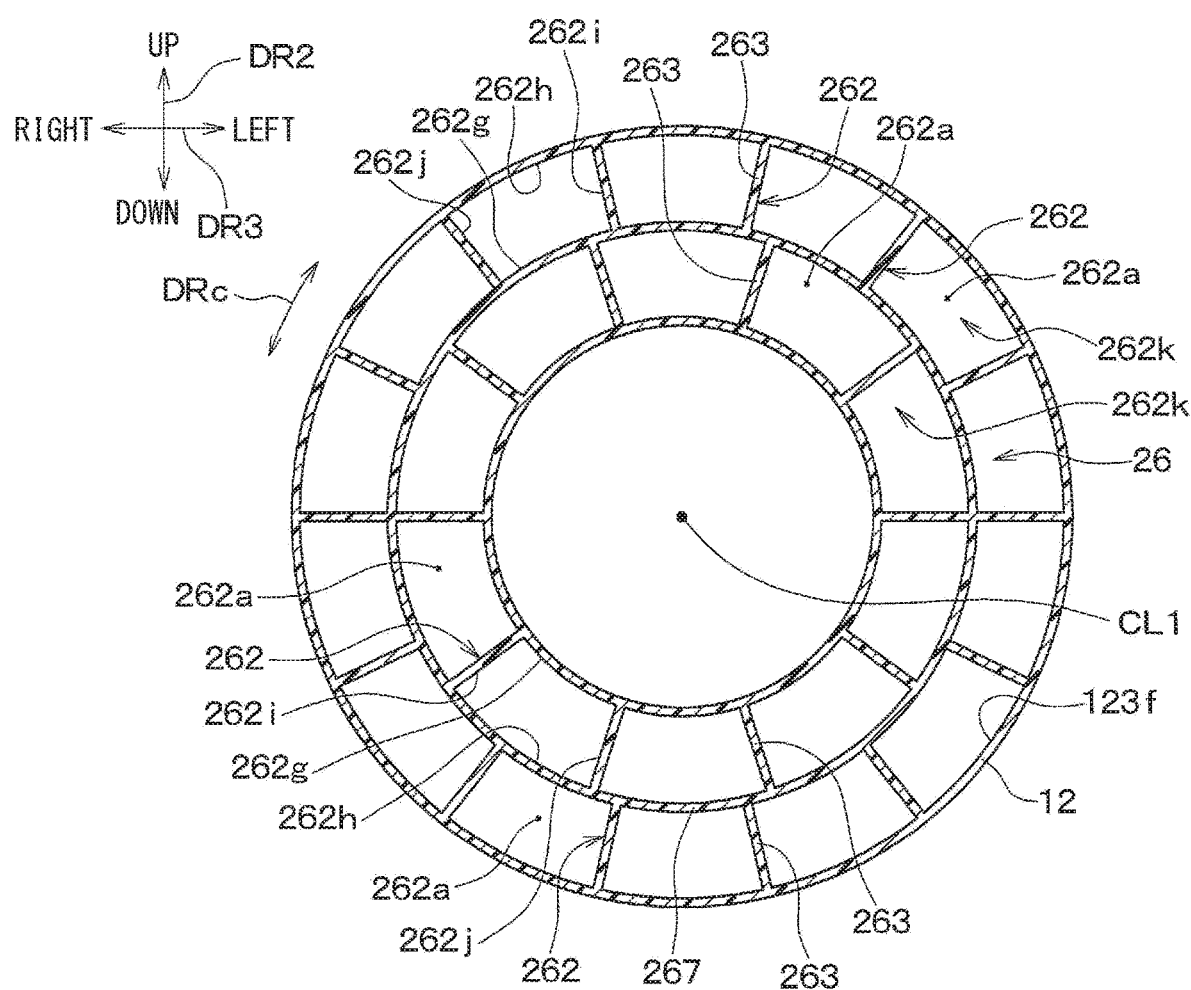
FIG. 17 is a cross-sectional view showing a schematic shape of a rectifying mechanism of an eighth embodiment and taken along line XIII-XIII in FIG. 12, and is a cross-sectional view corresponding to FIG. 13.
Figure 18:
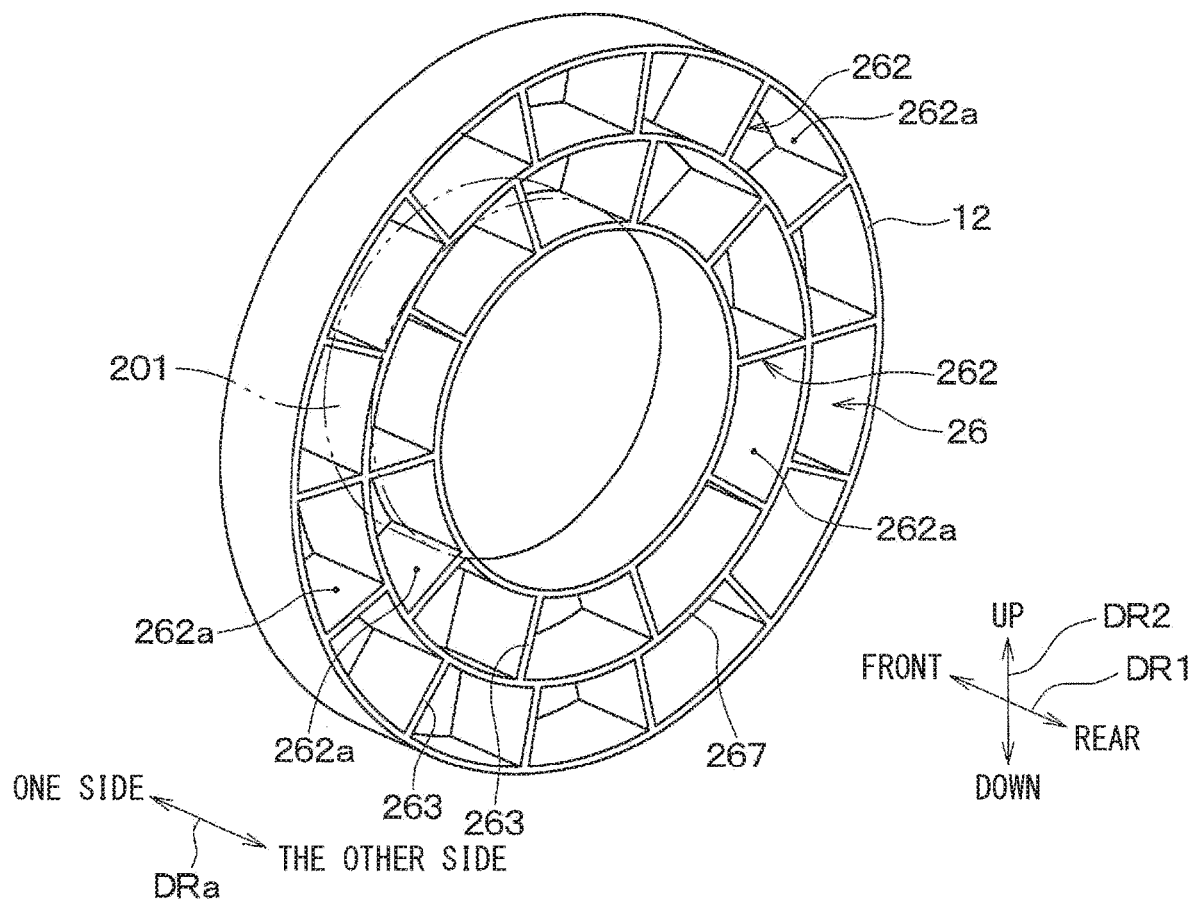
FIG. 18 is a perspective view showing a blower fan by a two-dot chain line and extracting and showing the rectifying mechanism in the eighth embodiment, and is a view corresponding to FIG. 14.

As shown in FIGS. 17 and 18, through-holes 262a extending in a fan axial direction DRa are formed in a plurality of tubular portions 262, respectively. In this respect, the present embodiment is the same as the sixth embodiment. However, in the present embodiment, a hole shape of the through-hole 262a formed in each of the plurality of tubular portions 262 is different from that in the sixth embodiment.

Specifically, in the present embodiment, each of a plurality of through-holes 262a is a rectangular hole whose cross section orthogonal to the fan axial direction DRa has a rectangular shape. The rectangular shape of the cross section of the through-hole 262a may be a strict rectangular shape or a square shape, and, for example, any one or all of the four sides surrounding the cross-section of the through-hole 262a may be curved as long as the rectangular shape of the cross section of the through-hole 262a is a substantially rectangular shape.

A portion of an air conditioning case 12 surrounding a rectifying mechanism 26 is formed in a cylindrical shape centered on a fan axis CL1. The plurality of through-holes 262a formed in the rectifying mechanism 26 are arranged radially in a fan radial direction. For that reason, a plurality of rows of through-holes 262a arranged in a fan circumferential direction DRc are formed in a concentric shape centered on the fan axis CL1. Peripheral partition walls 263 separating between through-holes 262a adjacent to each other in the fan circumferential direction DRc are provided so as to extend radially in the fan radial direction.

In addition, the rectifying mechanism 26 has a diameter partition wall 267 separating between through-holes 262a adjacent to each other in the fan radial direction, in addition to the peripheral partition walls 263. The diameter partition wall 267 has a cylindrical shape centered on the fan axis CL1. Both of the peripheral partition wall 263 and the diameter partition wall 267 have a plate shape, and function as partition plates partitioning between through-holes 262a adjacent to each other among the plurality of through-holes 262a.

In detail, the air conditioning case 12 has a rectifying mechanism circumferential surface 123f, as a part of an inner wall surface forming the in-case passage 123, that faces, from the outside in the fan radial direction, a portion of an in-case passage 123 in which the rectifying mechanism 26 is arranged. The rectifying mechanism circumferential surface 123f is formed so that a cross section thereof orthogonal to the fan axial direction DRa has a circular shape centered on the fan axis CL1 and surrounds the rectifying mechanism 26.

As shown in FIGS. 17 and 18, the plurality of through-holes 262a provided in the rectifying mechanism 26 are arranged so as to be aligned around the fan axis CL1 along the rectifying mechanism circumferential surface 123f of the air conditioning case 12.

In addition, in the cross section orthogonal to the fan axial direction DRa, each of the plurality of through-holes 262a has the rectangular shape as described above, but exactly has a shape as shown in FIG. 17. That is, each of the plurality of through-holes 262a has a cross-sectional shape in which it is surrounded by an inner arc portion 262g, an outer arc portion 262h, one side straight portion 262i, and the other side straight portion 262j.

In the cross section orthogonal to the fan axial direction DRa, the inner arc portion 262g has an arc shape centered on the fan axis CL1. In addition, the outer arc portion 262h is provided outside the inner arc portion 262g in the fan radial direction, and has an arc shape concentric with the inner arc portion 262g. In addition, the one side straight portion 262i has a straight line shape extending in the fan radial direction toward the fan axis CL1, which is the center of a blower fan 201, and connects one end of the inner arc portion 262g and one end of the outer arc portion 262h to each other. In addition, the other side straight portion 262j has a straight line shape extending in the fan radial direction toward the fan axis CL1, and connects the other end of the inner arc portion 262g and the other end of the outer arc portion 262h to each other. The inner arc portion 262g, the outer arc portion 262h, the one side straight portion 262i, and the other side straight portion 262j constitute hole wall surfaces facing the through-hole 262a, respectively.

The plurality of through-holes 262a having such a shape form an annular through-hole group 262k in which the through-holes 262a are arranged side by side in an annular shape around the fan axis CL1 through the peripheral partition walls 263. A plurality of annular through-hole groups 262k are formed in a concentric shape centered on the fan axis CL1, and are provided adjacent to each other through the diameter partition wall 267 in the fan radial direction. For example, in the present embodiment, two annular through-hole groups 262k are provided.

In addition, all of the plurality of through-holes 262a provided in the rectifying mechanism 26 are formed so that passage cross-sectional areas of the through-holes 262a are identical to each other. Since the through-hole 262a is a hole extending in the fan axial direction DRa, the passage cross-sectional area of the through-hole 262a is a cross-sectional area of the through-hole 262a in a cross section orthogonal to the fan axial direction DRa.

In addition, each of a plurality of peripheral partition walls 263 has a plate shape extending with a certain thickness, and all of the plurality of peripheral partition walls 263 have the equal plate thickness. Further, the diameter partition wall 267 also has a plate shape extending at a constant plate thickness. The diameter partition wall 267 is formed to have a plate thickness equal to that of the peripheral partition wall 263.

The rectifying mechanism 26 configured as described above to suppress the swirling flow by allowing air blown out from the blower fan 201 to pass through the plurality of through-holes 262a.

The present embodiment is the same as the sixth embodiment except for those described above. In the present embodiment, effects achieved from a configuration common to the sixth embodiment described above can be obtained, similar to the sixth embodiment.

In addition, according to the present embodiment, each of a plurality of through-holes 262a formed in the rectifying mechanism 26 is the rectangular hole whose cross section orthogonal to the fan axial direction DRa has the rectangular shape. The plurality of through-holes 262a are arranged radially in the fan radial direction. Therefore, in a case where a shape of an arrangement portion of the rectifying mechanism 26 in the air conditioning case 12 is a cylindrical shape according to an outer shape of the blower fan 201 as in the present embodiment, it is easy to make the passage cross-sectional areas of the plurality of through-holes 262a uniform. For that reason, for example, a variation in a wind speed distribution of the air passing through the rectifying mechanism 26 can be suppressed to adjust the wind speed distribution. When the variation in the wind speed distribution is suppressed, turbulence of a wind flow is also suppressed on an air flow downstream side with respect to the rectifying mechanism 26.

In addition, according to the present embodiment, as shown in FIGS. 17 and 18, the air conditioning case 12 has the rectifying mechanism circumferential surface 123f facing a portion of an in-case passage 123 at which the rectifying mechanism 26 is arranged from the outside in the fan radial direction. The rectifying mechanism circumferential surface 123f is formed so that the cross section thereof orthogonal to the fan axial direction DRa has the circular shape centered on the fan axis CL1 and surrounds the rectifying mechanism 26. In addition, the plurality of through-holes 262a provided in the rectifying mechanism 26 are arranged so as to be aligned around the fan axis CL1 along the rectifying mechanism circumferential surface 123f of the air conditioning case 12. The rectifying mechanism 26 suppresses the swirling flow by allowing the air blown out from the blower fan 201 to pass through the plurality of through-holes 262a.

Here, an air flow constituting the swirling flow is along each hole wall surface facing the through-holes 262a of the rectifying mechanism 26, such that the swirling flow is suppressed.

The plurality of through-holes 262a are arranged so as to be aligned around the fan axis CL1 as described above. For that reason, it is easy to form each through-hole 262a so that wall surface directions that the hole wall surfaces of each through-hole 262a suppressing the swirling flow form relative to a swirl direction (specifically, a direction facing the fan circumferential direction DRc) of the swirling flow are identical to each other in all through-holes 262a.

Therefore, it is easy to make a ventilation resistance of the rectifying mechanism 26 uniform over the entire rectifying mechanism 26 while maintaining a rectification property of the rectifying mechanism 26. If the ventilation resistance can be made uniform, the turbulence of the wind flow is also suppressed, and it is thus possible to reduce pressure loss of the wind flow.

Further, according to the present embodiment, all of the plurality of through-holes 262a are formed so that the passage cross-sectional areas of the through-holes 262a are identical to each other. The diameter partition wall 267 and the plurality of peripheral partition walls 263 are formed so that the plate thicknesses of the partition walls 263 and 267 are identical to each other in all of the partition walls 263 and 267. Therefore, also in this regard, it can be said that the ventilation resistance of the rectifying mechanism 26 can be made uniform over the entire rectifying mechanism 26.

Ninth Embodiment

Next, a ninth embodiment will be described. In the present embodiment, portions different from those of the first embodiment described above will be mainly described.

Figure 19:
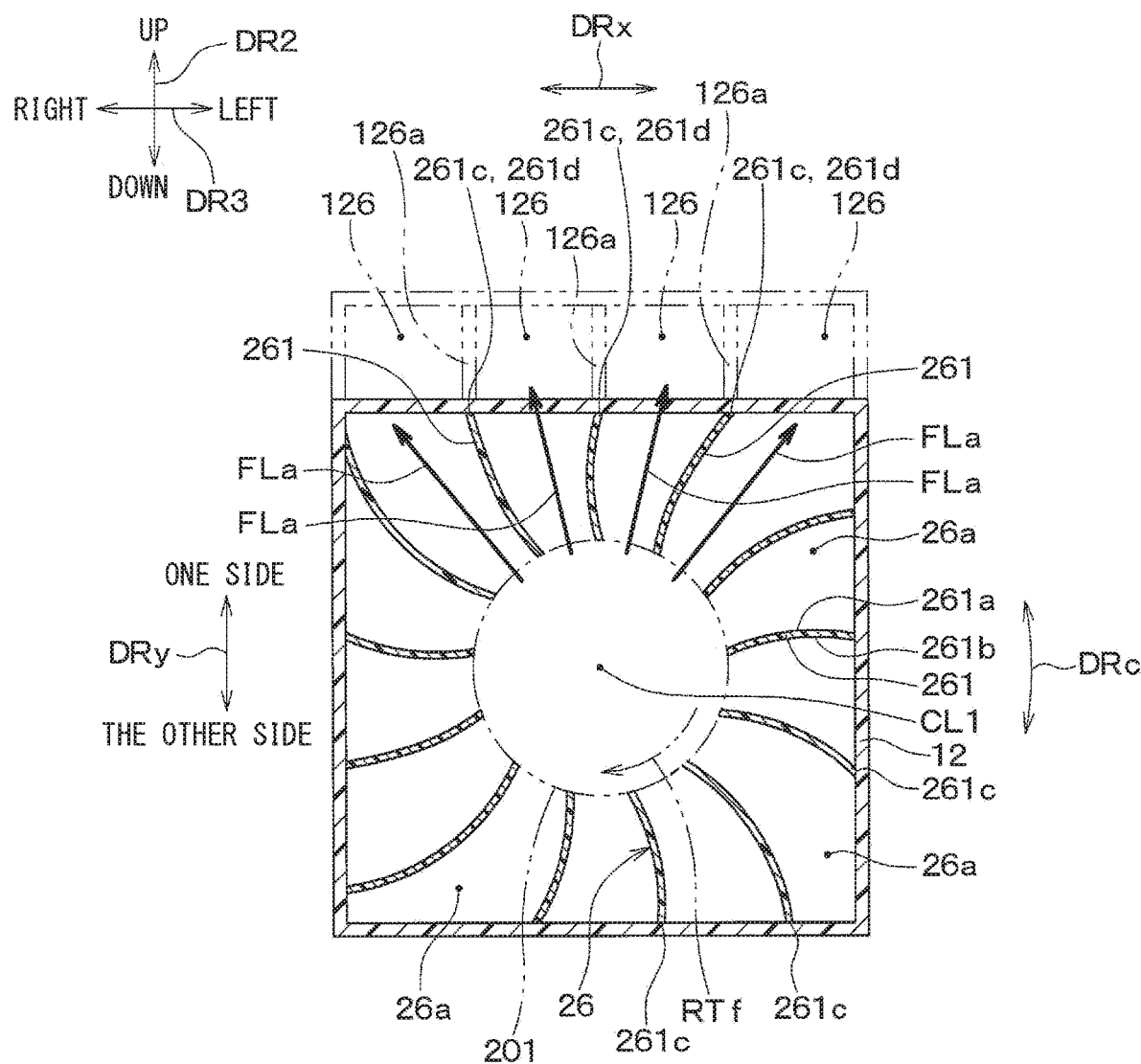
FIG. 19 is a cross-sectional view showing a schematic shape of a rectifying mechanism of a ninth embodiment and taken along line XIII-XIII in FIG. 12, and is a cross-sectional view corresponding to FIG. 2.

As shown in FIGS. 12 and 19, in the present embodiment, a rectifying mechanism 26 has a plurality of rectifying plates 261 extending from the inside to the outside in a fan radial direction, similar to the first embodiment. A plurality of face blow-out ports 126 are arranged at positions offset from a fan axis CL1 to one side in a predetermined arrangement direction DRy, which is one direction orthogonal to the fan axis CL1. For example, the predetermined arrangement direction DRy is not limited to an up and down direction DR2 of a vehicle, but coincides with the up and down direction DR2 of the vehicle in the present embodiment, such that one side in the predetermined arrangement direction DRy is an upper side and the other side in the predetermined arrangement direction DRy is a lower side.

In addition, as shown in FIG. 19, the plurality of face blow-out ports 126 are provided side by side in a blow-out port arrangement direction DRx intersecting a fan axial direction DRa. For example, the blow-out port arrangement direction DRx is not limited to a width direction DR3 of the vehicle, but coincides with the width direction DR3 of the vehicle in the present embodiment.

In addition, an air conditioning case 12 has a plurality of blow-out port boundary portions 126a, and the blow-out port boundary portion 126a is provided between face blow-out ports 126 adjacent to each other among the face blow-out ports 126 and separates the face blow-out ports 126 from each other. In detail, the blow-out port boundary portion 126a is provided between connected portions connected to an in-case passage 123 among the plurality of face blow-out ports 126, and separates the connected portions from each other.

In addition, the plurality of rectifying plates 261 have outer end portions 261c at outer ends in the fan radial direction, respectively. Further, any of a plurality of outer end portions 261c are provided as one end portions 261d positioned closer to one side than a position of the fan axis CL1 in the predetermined arrangement direction DRy. All of the one end portions 261d are positioned outside a blower fan 201 in a radial direction.

In this respect, the present embodiment is the same as the first embodiment. In addition to those described above, in the present embodiment, positions of the blow-out port boundary portions 126a are aligned with those of the one end portions 261d of the rectifying plates 261, respectively, in the blow-out port arrangement direction DRx, unlike the first embodiment. The alignment of the position of the blow-out port boundary portion 126a with the position of the one end portion 261d is not limited to complete coincidence between these positions, but may be substantial coincidence between these positions. The same applies to embodiments as described later.

The present embodiment is the same as the first embodiment except for portions mentioned as being different from those of the first embodiment as described above. In the present embodiment, effects achieved from a configuration common to the first embodiment described above can be obtained, similar to the first embodiment.

In addition, according to the present embodiment, the positions of the blow-out port boundary portions 126a of the air conditioning case 12 are aligned with those of the one end portions 261d of the rectifying plates 261 in the blow-out port arrangement direction DRx. Therefore, as compared with a case where the positions of the blow-out port boundary portions 126a are arranged regardless of the positions of the one end portions 261d, a wind is smoothly directed to the plurality of face blow-out ports 126, such that it is possible to improve air distribution performance that the wind is evenly sent to the plurality of face blow-out ports 126. For example, the rectifying mechanism 26 can be provided with a function as a wind direction guide that directs the wind toward each of the plurality of face blow-out ports 126 as indicated by arrows FLa in FIG. 19.

Note that the present embodiment is a modification based on the first embodiment, but it is possible to combine the present embodiment with the fifth embodiment described above.

Tenth Embodiment

Next, a tenth embodiment will be described. In the present embodiment, portions different from those of the fourth embodiment described above will be mainly described.

Figure 20:
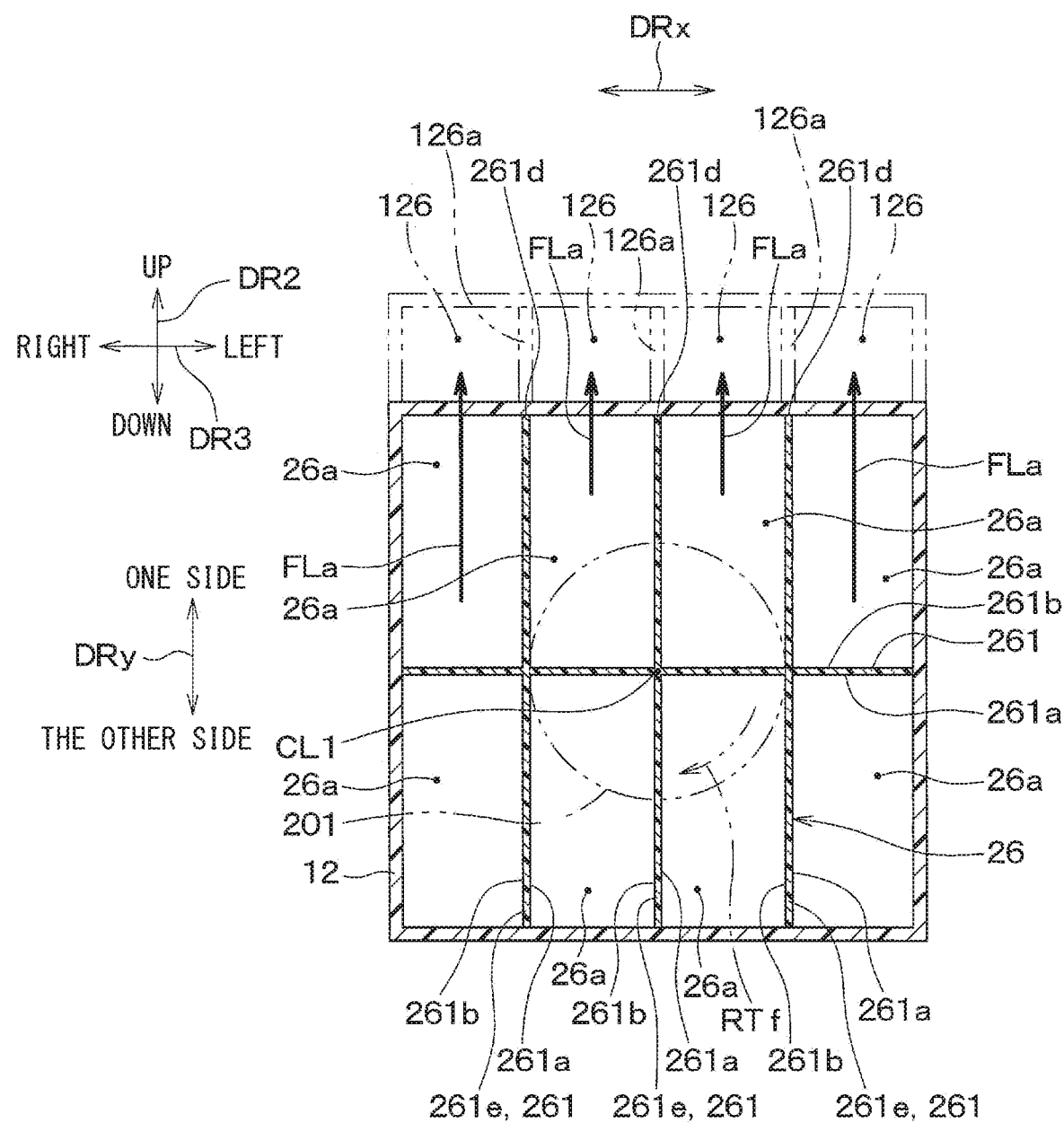
FIG. 20 is a cross-sectional view showing a schematic shape of a rectifying mechanism of a tenth embodiment and taken along line XIII-XIII in FIG. 12, and is a cross-sectional view corresponding to FIG. 9.

As shown in FIGS. 12 and 20, in an air-conditioning unit 10 for vehicles according to the present embodiment, a face blow-out port 126 and a defroster blow-out port 127 are provided so as to be shifted upward as compared with the fourth embodiment.

In this respect, the present embodiment is different from the fourth embodiment, but is otherwise the same as the fourth embodiment. That is, in the present embodiment, a rectifying mechanism 26 has rectifying plates 261 partitioning and forming a plurality of rectifying passages 26a, similar to the fourth embodiment. A plurality of face blow-out ports 126 are provided as described in the ninth embodiment, and an air conditioning case 12 has a plurality of blow-out port boundary portions 126a as described in the ninth embodiment.

In addition, some of the plurality of rectifying plates 261 are provided as specified rectifying plates 261e formed so as to extend from one side to the other side in a predetermined arrangement direction DRy. The specified rectifying plate 261e has one end portion 261d at one end in the predetermined arrangement direction DRy, and the one end portion 261d is positioned closer to one side than a position of a fan axis CL1 in the predetermined arrangement direction DRy.

In addition, similar to the description in the ninth embodiment, positions of the blow-out port boundary portions 126a are aligned with those of the one end portions 261d of the specified rectifying plates 261e, respectively, in a blow-out port arrangement direction DRx. In this respect, the present embodiment is the same as the fourth embodiment.

In the present embodiment, effects achieved from a configuration common to the fourth embodiment described above can be obtained, similar to the fourth embodiment.

In addition, according to the present embodiment, the position of the blow-out port boundary portion 126a of the air conditioning case 12 is aligned with that of the one end portion 261d in the blow-out port arrangement direction DRx, similar to the ninth embodiment. Therefore, similar to the ninth embodiment, a wind is smoothly directed to the plurality of face blow-out ports 126 as indicated by arrows FLa, such that it is possible to improve air distribution performance to the plurality of face blow-out ports 126.

Note that the present embodiment is a modification based on the fourth embodiment, but it is possible to combine the present embodiment with the fifth embodiment described above.

Eleventh Embodiment

Next, an eleventh embodiment will be described. In the present embodiment, portions different from those of the sixth embodiment described above will be mainly described.

Figure 21:
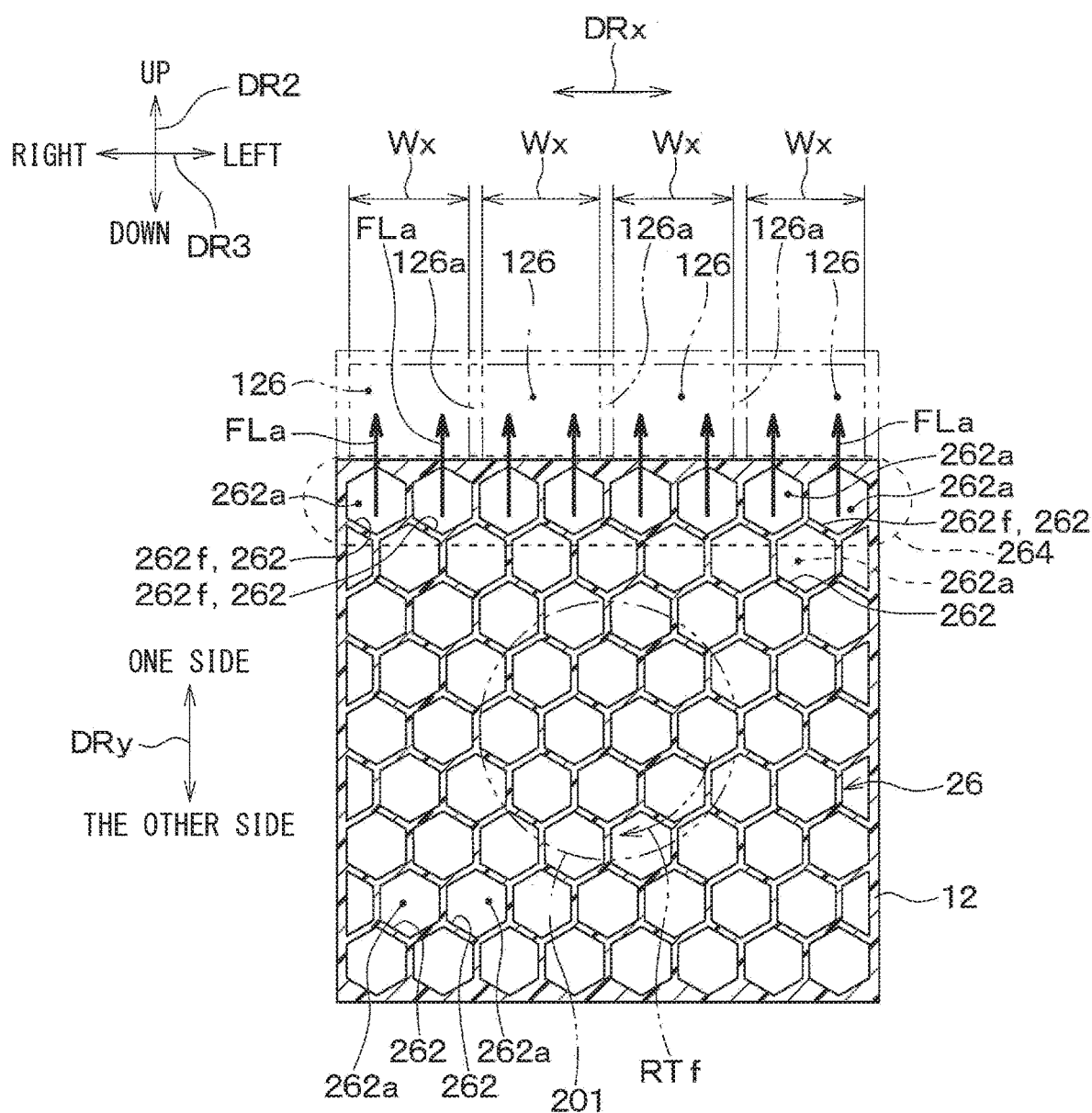
FIG. 21 is a cross-sectional view showing a schematic shape of a rectifying mechanism of an eleventh embodiment and taken along line XIII-XIII in FIG. 12, and is a cross-sectional view corresponding to FIG. 13.

As shown in FIGS. 12 and 21, in the present embodiment, a rectifying mechanism 26 has a rectangular plate shape, and is formed of a honeycomb-shaped porous material in which a plurality of through-holes 262a are formed, similar to the sixth embodiment. A plurality of face blow-out ports 126 are provided as described in the ninth embodiment, and an air conditioning case 12 has a plurality of blow-out port boundary portions 126a as described in the ninth embodiment.

In addition, as shown in FIG. 21, the rectifying mechanism 26 having a rectangular shape has an edge portion 264 extending in a blow-out port arrangement direction DRx on one side in a predetermined arrangement direction DRy. The edge portion 264 is configured by arranging some tubular portions 262f of a plurality of tubular portions 262 along the blow-out port arrangement direction DRx.

In this respect, the present embodiment is the same as the sixth embodiment. In addition to those described above, in the present embodiment, unlike the sixth embodiment, in the edge portion 264, the number of the through-holes 262a within the respective blow-out port width Wx of each of the face blow-out ports 126 in the blow-out port arrangement direction DRx is equal to each other. In FIG. 21, the number of the through-holes 262a within each of the blow-out port widths Wx is approximately two.

Note that the blow-out port width Wx is, more specifically, a width occupied by each of the plurality of face blow-out ports 126 in the blow-out port arrangement direction DRx. In the present embodiment, the blow-out port width Wx of each face blow-out port 126 is, for example, the same in all face blow-out ports 126.

In addition, the number of through-holes 262a that fall within the range of the blow-out port width Wx is not limited to an integer, and may be a decimal. For example, if a half of the through-hole 262a is within the blow-out port width Wx, the number of through-hole 262a is 0.5. In addition, the alignment of the numbers of through-holes 262a with each other as described above is not limited to complete coincidence between the numbers of through-holes 262a, but may be substantial coincidence between the numbers of through-holes 262a.

The present embodiment is the same as the sixth embodiment except for portions mentioned as being different from those of the sixth embodiment as described above. In the present embodiment, effects achieved from a configuration common to the sixth embodiment described above can be obtained, similar to the sixth embodiment.

In addition, according to the present embodiment, in the edge portion 264 of the rectifying mechanism 26, the numbers of through-holes 262a that fall within the ranges of the respective blow-out port widths Wx of the face blow-out ports 126 in the blow-out port arrangement direction DRx are aligned with each other in the case of comparing the respective blow-out port widths Wx with each other. Therefore, as compared with a case where the through-holes 262a included in the edge portion 264 of the rectifying mechanism 26 are arranged regardless of the blow-out port widths Wx, it is possible to suppress a variation in an airflow ratio of air flowing to each face blow-out port 126.

Note that the present embodiment is a modification based on the sixth embodiment, but it is possible to combine the present embodiment with the seventh embodiment described above.

Twelfth Embodiment

Next, a twelfth embodiment will be described. In the present embodiment, portions different from those of the eighth embodiment described above will be mainly described.

Figure 22:
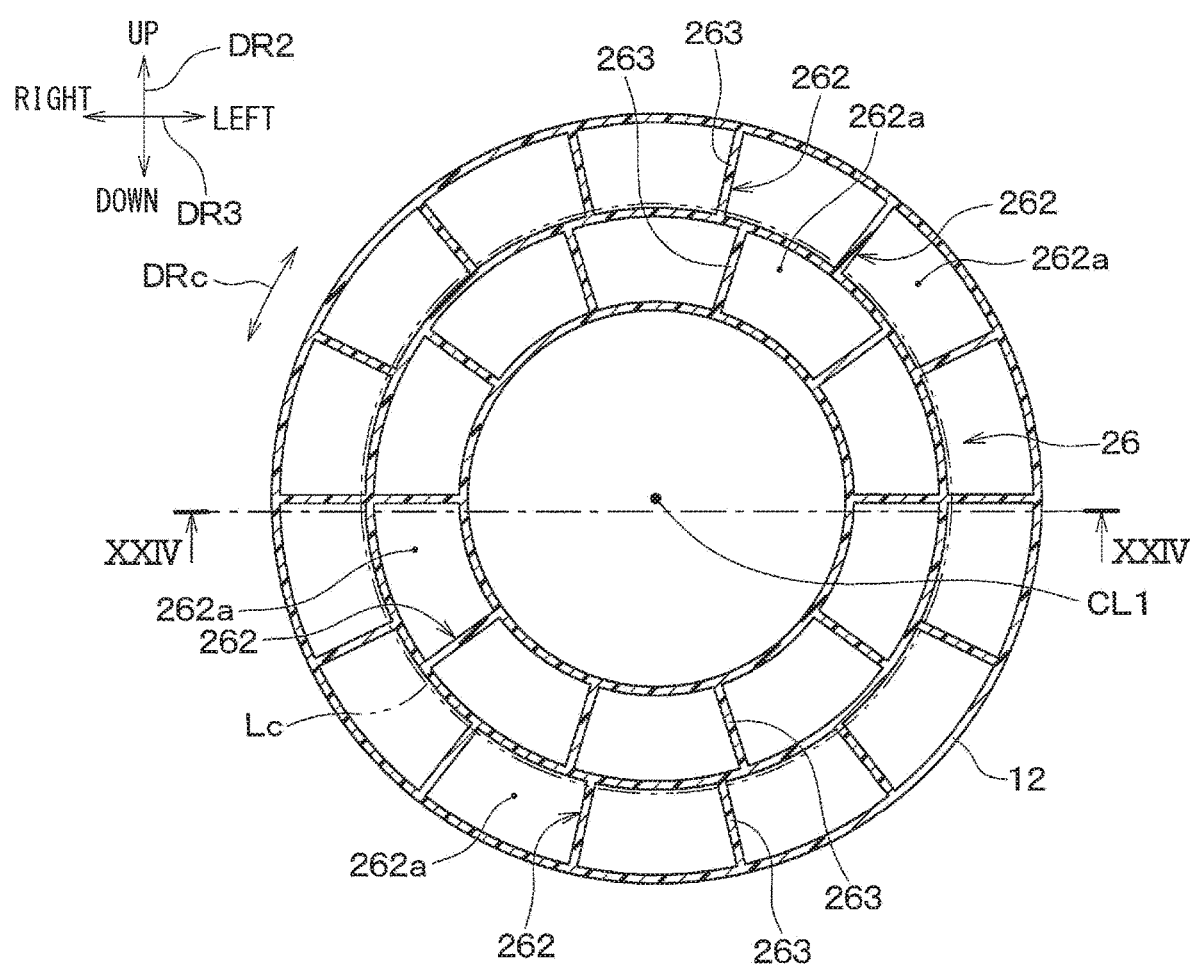
FIG. 22 is a cross-sectional view showing a schematic shape of a rectifying mechanism of a twelfth embodiment and taken along line XIII-XIII in FIG. 12, and is a cross-sectional view corresponding to FIG. 17.
Figure 23:
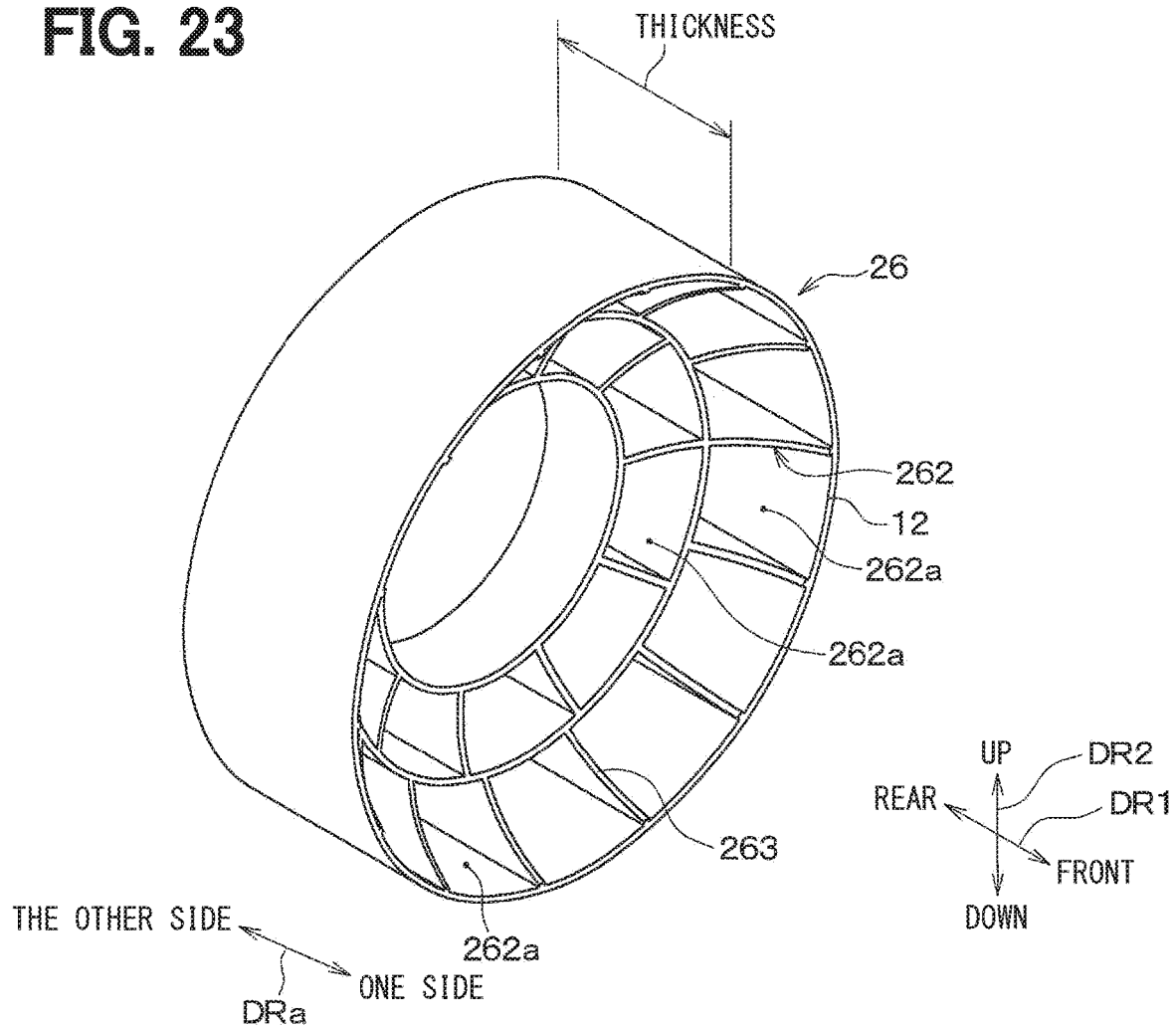
FIG. 23 is a perspective view showing the rectifying mechanism extracted in the twelfth embodiment, and is a view corresponding to FIG. 18.
Figure 24:
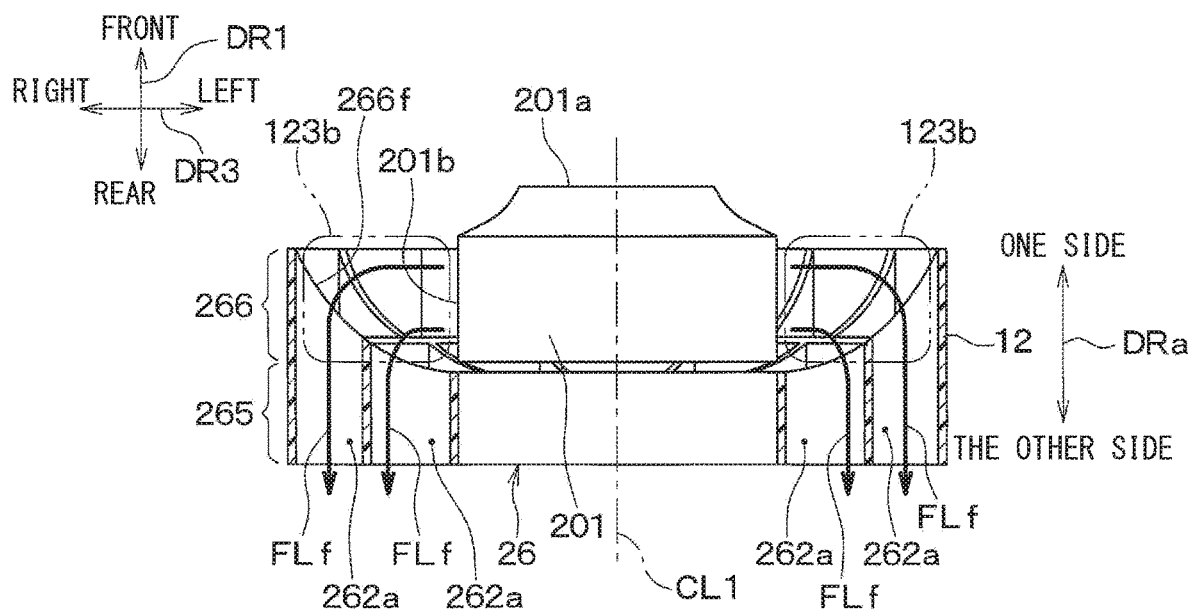
FIG. 24 is a cross-sectional view taken along line XXIV-XXIV of FIG. 22.

As shown in FIGS. 22 to 24, a rectifying mechanism 26 of the present embodiment has the other side portion 265 provided on the other side in a fan axial direction DRa with respect to a blower fan 201 and a fan circumferential portion 266 arranged in a fan circumferential space 123b.

The fan circumferential portion 266 is formed so as to extend from the other side portion 265 to one side in the fan axial direction DRa, and is configured integrally with the other side portion 265. In detail, each of a plurality of through-holes 262a formed in the rectifying mechanism 26 continuously extends in the fan axial direction DRa from the other side portion 265 to the fan circumferential portion 266. Therefore, the fan circumferential portion 266 guides air blown out from a fan air outlet 201b of the blower fan 201 to the other side portion 265 as indicated by arrows FLf in FIG. 24.

In addition, the fan circumferential portion 266 is formed so as to greatly extend in the fan axial direction DRa from the other side portion 265 into the fan circumferential space 123b toward the outside in a fan radial direction. In other words, the fan circumferential portion 266 has one end 266f on one side in the fan axial direction DRa, and the one end 266f is formed so as to be positioned on one side in the fan axial direction DRa toward the outside in the fan radial direction.

The present embodiment is the same as the eighth embodiment except for those described above. In the present embodiment, effects achieved from a configuration common to the eighth embodiment described above can be obtained, similar to the eighth embodiment.

In addition, according to the present embodiment, the rectifying mechanism 26 has the other side portion 265 provided on the other side in the fan axial direction DRa with respect to the blower fan 201 and the fan circumferential portion 266 arranged in the fan circumferential space 123b. The fan circumferential portion 266 guides the air blown out from the fan air outlet 201b of the blower fan 201 to the other side portion 265 as indicated by the arrows FLf in FIG. 24. Therefore, as compared with a case where the rectifying mechanism 26 does not have the fan circumferential portion 266, it is easy to make an airflow distribution of the air flowing from the blower fan 201 into the rectifying mechanism 26 uniform while ensuring a good rectification property of the rectifying mechanism 26.

Thirteenth Embodiment

Next, a thirteenth embodiment will be described. In the present embodiment, portions different from those of the twelfth embodiment described above will be mainly described.

Figure 25:
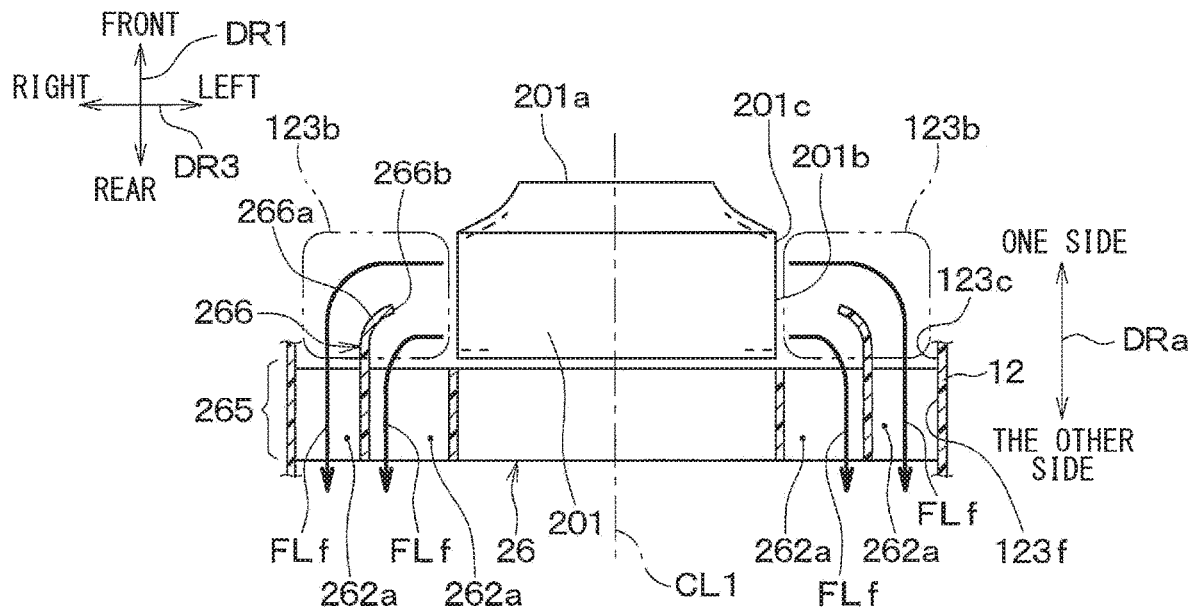
FIG. 25 is a cross-sectional view showing a schematic shape of a rectifying mechanism of a thirteenth embodiment, and is a view corresponding to FIG. 24.

As shown in FIG. 25, in the present embodiment, a fan circumferential portion 266 of a rectifying mechanism 26 has a circumferential rib 266a. The fan circumferential portion 266 may have components other than the circumferential rib 266a, but the fan circumferential portion 266 of the present embodiment has only the circumferential rib 266a.

The circumferential rib 266a protrudes from the other side portion 265 to one side of a fan axial direction DRa and extends in a fan circumferential direction DRc (see FIG. 22). The circumferential rib 266a continuously extends over the entire circumference around a fan axis CL1, for example, as indicated by a two-dot chain line Lc in FIG. 22. A length of the two-dot chain line Lc indicates a range in which the circumferential rib 266a is provided in the fan circumferential direction DRc.

In addition, as shown in FIG. 25, the circumferential rib 266a is provided at a position spaced apart from a circumferential case surface 123c (in other words, a fan surrounding surface 123c) provided around a fan circumferential space 123b inward in a fan radial direction. In short, the circumferential rib 266a is arranged with an interval inward in the fan radial direction with respect to the circumferential case surface 123c. At the same time, the circumferential rib 266a is provided outside a blower fan 201 in the fan radial direction, and is arranged with an interval in the fan radial direction with respect to the blower fan 201. That is, in the rectifying mechanism 26 of the present embodiment, through-holes 262a as air passages are provided on both of the outside or the inside with respect to the circumferential rib 266a in the fan radial direction. Note that the circumferential case surface 123c described above is an inner wall surface of an air conditioning case 12, and is an inner wall surface facing the fan circumferential space 123b from the outside in the fan radial direction. The circumferential case surface 123c is continuously connected to a rectifying mechanism circumferential surface 123f, and is formed, for example, such that a cross section thereof orthogonal to the fan axial direction DRa has a circular shape centered on the fan axis CL1.

In addition, the circumferential rib 266a has a tip 266b on one side in the fan axial direction DRa. The circumferential rib 266a is bent so as to be positioned inward in the fan radial direction as it becomes close to the tip 266b.

In addition, in the fan axial direction DRa, one end 201c of a fan air outlet 201b is positioned closer to one side than the tip 266b of the circumferential rib 266a.

The present embodiment is the same as the twelfth embodiment except for those described above. In the present embodiment, effects achieved from a configuration common to the twelfth embodiment described above can be obtained, similar to the twelfth embodiment.

In addition, according to the present embodiment, the circumferential rib 266a is provided at a position spaced apart from the circumferential case surface 123c that the air conditioning case 12 has and that faces the fan circumferential space 123b. Therefore, it is possible to adjust an airflow of air flowing from the blower fan 201 to the outside in a radial direction of the circumferential rib 266a by the circumferential rib 266a. Thus, it becomes easy to make, for example, an airflow distribution of the air flowing from the blower fan 201 into the rectifying mechanism 26 uniform in the fan radial direction.

Fourteenth Embodiment

Next, a fourteenth embodiment will be described. In the present embodiment, portions different from those of the first embodiment described above will be mainly described.

Figure 26:
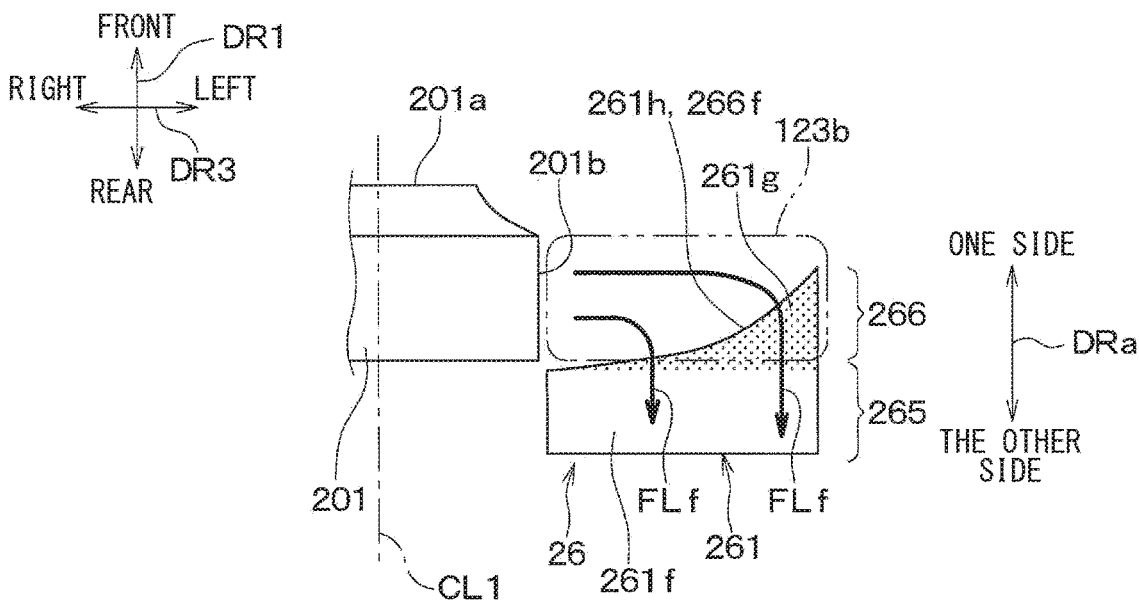
FIG. 26 is a cross-sectional view showing a schematic shape of a rectifying mechanism of a fourteenth embodiment, and is a view corresponding to FIG. 24.

As shown in FIG. 26, in the present embodiment, as compared with the first embodiment, each of a plurality of rectifying plates 261 included in a rectifying mechanism 26 extend to one side in a fan axial direction DRa to enter a fan circumferential space 123b. In FIG. 26, a portion enlarged as compared with the first embodiment in the rectifying plate 261 of the present embodiment is indicated by point hatching.

Therefore, the rectifying mechanism 26 of the present embodiment also has the other side portion 265 and a fan circumferential portion 266, similar to the twelfth embodiment. That is, in the present embodiment, each of the plurality of rectifying plates 261 has a first plate portion 261f included in the other side portion 265 and a second plate portion 261g included in the fan circumferential portion 266. The first plate portion 261f and the second plate portion 261g are, for example, continuously configured integrally with each other without a boundary.

In addition, the second plate portion 261g has one end 261h on one side in the fan axial direction DRa. The one end 261h of the second plate portion 261g is formed so as to be positioned close to one side of the fan axial direction DRa toward the outside in a fan radial direction. Note that the one end 261h of the second plate portion 261g is also one end 266f of the fan circumferential portion 266.

The present embodiment is the same as the first embodiment except for those described above. In the present embodiment, effects achieved from a configuration common to the first embodiment described above can be obtained, similar to the first embodiment.

In addition, according to the present embodiment, the rectifying mechanism 26 has the plurality of rectifying plates 261 extending from the inside to the outside in the fan radial direction, similar to the first embodiment. Therefore, it is possible to obtain a function similar to the function of the rectifying plate 261 (see FIG. 2) of the first embodiment.

Each of the plurality of rectifying plates 261 of rectifying mechanism 26 in the present embodiment has the first plate portion 261f included in the other side portion 265 and the second plate portion 261g included in the fan circumferential portion 266. Therefore, similar to the twelfth embodiment, it is easy to make an airflow distribution of air flowing from a blower fan 201 into the rectifying mechanism 26 uniform while ensuring a good rectification property of the rectifying mechanism 26.

Other Embodiments (1) In the first embodiment described above, as shown in FIG. 1, the rectifying mechanism 26 is arranged on the air flow upstream side with respect to the bypass passages 125a and 125b and the heater core 18, but this is an example. For example, it is conceivable that the rectifying mechanism 26 is arranged on the air flow downstream side with respect to the bypass passages 125a and 125b and the heater core 18. The same applies to the second, fourth, and fifth embodiments described above.

(2) In the fourth embodiment described above, as shown in FIG. 9, the plurality of rectifying plates 261 are provided and connected to each other, but the plurality of rectifying plates 261 may not be connected to each other or only one rectifying plate may be provided instead of the plurality of rectifying plates 261. For example, in a case where the number of rectifying plates 261 is one, the rectifying plate 261 forms two rectifying passages 26a arranged in a portion where the rectifying mechanism 26 is arranged in the in-case passage 123.

(3) In each of the embodiments described above, for example, as shown in FIG. 1, the blower fan 201 is the centrifugal fan, but is not limited thereto, and may be, for example, an axial fan or a mixed flow fan.

(4) In the sixth embodiment described above, as shown in FIG. 12, the face blow-out port 126 and the defroster blow-out port 127 are offset upward as compared to FIG. 1 of the first embodiment, but this is an example. Positions of the face blow-out port 126 and the defroster blow-out port 127 in the up and down direction may be any of positions of FIGS. 1 and 12, and are not limited to any of positions of FIGS. 1 and 12. The same applies to the embodiments other than the sixth embodiment.

(5) In the sixth embodiment described above, as shown in FIG. 13, the through-holes 262a of the plurality of tubular portions 262 have the same size, but are not limited thereto, and through-holes 262a having a different size may be included in the plurality of through-holes 262a. That is, all of passage cross-sectional areas of the plurality of through-holes 262a do not need to be identical to each other. The same applies to each embodiment after the seventh embodiment.

(6) In the sixth embodiment described above, as shown in FIG. 13, all of the plurality of through-holes 262a are hexagonal holes and are holes having the same cross-sectional shape, but this is an example. For example, through-holes 262a having a different cross-sectional shape, such as circular holes or the like, may be included in the plurality of through-holes 262a. The same applies to each embodiment after the seventh embodiment.

(7) In the ninth embodiment described above, as shown in FIG. 19, the blow-out port arrangement direction DRx coincides with the width direction DR3 of the vehicle, and is thus a direction along a straight line extending in the width direction DR3 of the vehicle, but the blow-out port arrangement direction DRx may be a direction along a curved curve. The same applies to the embodiments other than the ninth embodiment.

(8) In the tenth embodiment described above, as shown in FIG. 20, any one of the plurality of rectifying plates 261 are provided as the specified rectifying plates 261e formed so as to extend from one side to the other side in the predetermined arrangement direction DRy, but this is an example. For example, all of the rectifying plates 261 may be provided as the specified rectifying plates 261e.

(9) In the thirteenth embodiment described above, the circumferential rib 266a of FIG. 25 continuously extends over the entire circumference around the fan axis CL1, but this is an example. For example, the circumferential rib 266a may be intermittently provided over the entire circumference around the fan axis CL1. Alternatively, the circumferential rib 266a may be provided only in a part around the fan axis CL1.

(10) In the eighth embodiment described above, as shown in FIG. 17, each of the plurality of through-holes 262a has a cross-sectional shape in which it is surrounded by the inner arc portion 262g, the outer arc portion 262h, the one side straight portion 262i, and the other side straight portion 262j, but this is an example. For example, each of the cross-sectional shape of the plurality of through-holes 262a may be a trapezoidal shape.

(11) In the eighth embodiment described above, as shown in FIG. 17, the diameter partition wall 267 is formed so that the plate thickness of the diameter partition wall 267 is the same as that of the peripheral partition wall 263, but is not limited thereto, and it is conceivable that the plate thickness of the diameter partition wall 267 is different from that of the peripheral partition wall 263. In addition, it is also conceivable that the diameter partition wall 267 does not have a plate shape extending at a certain plate thickness.

Further, the plurality of peripheral partition walls 263 are formed so that all the circumferential partition walls 263 have the same plate thickness, but this is also an example. For example, it is also conceivable that peripheral partition walls 263 having a different plate thickness are included in the plurality of peripheral partition walls 263 included in the rectifying mechanism 26. In addition, it is also conceivable that the peripheral partition wall 263 does not have a plate shape extending at a certain plate thickness.

(12) Note that the present disclosure is not limited to the embodiment described above, and can be variously modified. In addition, the respective embodiments described above are not irrelevant to each other, and can be suitably combined with each other unless a combination is clearly impossible. In addition, in each of the embodiments described above, it is needless to say that elements constituting the embodiment are not necessarily essential unless otherwise specified as being essential and unless clearly considered as being essential in principle.

In addition, in each of the embodiments described above, in a case where numerical values such as the number, numerical values, amounts, ranges, and the like, of components of the embodiment are mentioned, they are not limited to specific numbers unless otherwise specified as being essential and unless clearly limited to specific numbers in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

According to a first aspect shown in some or all of the respective embodiments described above, the rectifying mechanism suppresses the swirling flow generated by the rotation of the blower fan in the air blown out from the blower fan as compared with that before the blown-out air flows into the rectifying mechanism.

In addition, according to a second aspect, the heater is arranged on the air flow downstream side with respect to the blower fan in the in-case passage, and heats the air. The in-case passage includes the bypass passages allowing the air to bypass the heater to flow therethrough. The rectifying mechanism suppresses the swirling flow of the air flowing through the bypass passages, of the blown-out air, as compared with that before the air flowing through the bypass passages flows into the rectifying mechanism. Therefore, it is possible to cause the rectifying mechanism to effectively exert an action of suppressing the swirling flow with respect to the air flowing through the bypass passages with small factors that weaken the swirling flow.

In addition, according to a third aspect, the rectifying mechanism is arranged on the air flow upstream side with respect to the heater in the in-case passage. Therefore, the air blown out from the blower fan flows into the heater after the swirling flow is suppressed by the rectifying mechanism. For that reason, it is possible to reduce the pressure loss when the air flows into the heater.

In addition, according to a fourth aspect, the plurality of blow-out ports for blowing out the air to the outside of the air conditioning case are formed in the air conditioning case, and the air passing through the rectifying mechanism is distributed and flows into each of the plurality of blow-out ports. The plurality of blow-out ports are arranged in only a partial area of the entire circumference around the fan axis in the circumferential direction of the fan axis.

In addition, according to a fifth aspect, the rectifying mechanism has the plurality of rectifying plates extending from the inside to the outside in the radial direction of the blower fan. The rectifying passages allowing the air to flow from the air flow upstream side to the air flow downstream side with respect to the rectifying mechanism in the in-case passage are formed between the plurality of rectifying plates. The interval between the plurality of rectifying plates becomes wide toward the outside in the radial direction. The rectifying mechanism suppresses the swirling flow by allowing the air blown out from the blower fan to pass through the rectifying passages. Here, the air flowing from the blower fan into the rectifying passages flows to the air flow downstream side while moving to the outside in the radial direction. Therefore, in the rectifying passages, even though the flow rate of the air flowing through the rectifying passages is maintained, the flow velocity of the air is decreased according to the increase in the interval between the plurality of rectifying plates. The swirling flow is suppressed in accordance with the decrease in the flow velocity. For that reason, it is possible to reduce the pressure loss due to the suppression of the swirling flow.

In addition, according to a sixth aspect, each of the plurality of rectifying plates is formed so as to be positioned on the forward direction side in the rotation direction of the blower fan toward the outside in the radial direction. Therefore, for example, as compared with a case where each rectifying plate extends straightly along the radial direction of the blower fan, as the air including the swirling flow moves to the outside in the radial direction, it is possible to gently turn a flow direction of the air toward the air flow downstream side of the in-case passage. For that reason, it is possible to reduce the pressure loss due to the suppression of the swirling flow.

In addition, according to a seven aspect, the rectifying mechanism has the rectifying plates partitioning and forming the plurality of rectifying passages. Each of the plurality of rectifying passages is a passage allowing the air to flow from the air flow upstream side to the air flow downstream side with respect to the rectifying mechanism in the in-case passage. The rectifying mechanism suppresses the swirling flow by allowing the air blown out from the blower fan to pass through the rectifying passages. Therefore, it is possible to suppress the swirling flow by simplifying a structure of the rectifying mechanism.

In addition, according to an eight aspect, the rectifying plate has the passage wall surfaces facing the rectifying passage, and the passage wall surfaces are formed along the axial direction of the fan axis. Therefore, it is possible to guide the air flow in the direction along the axial direction of the fan axis while suppressing the swirling flow generated by the rotation of the blower fan.

In addition, according to a ninth aspect, the filter filtering the air blown out from the blower fan is provided as the rectifying mechanism. Therefore, it is possible to reduce the number of components by using the filter included in the air-conditioning unit for vehicles as the rectifying mechanism.

In addition, according to a tenth aspect, the cooling heat exchanger in which the plurality of passages through which the air blown out from the blower fan passes are formed and which cools the air passing through the plurality of passages is provided as the rectifying mechanism. Therefore, it is possible to reduce the number of components by using the cooling heat exchanger included in the air-conditioning unit for vehicles as the rectifying mechanism.

In addition, according to an eleventh aspect, the blower fan is the centrifugal fan.

In addition, according to a twelfth aspect, the rectifying mechanism has the plurality of tubular portions in which the through-holes extending in the axial direction are formed, and the plurality of tubular portions are provided so that the respective through-holes are arranged in parallel with each other. In addition, the rectifying mechanism is configured by configuring tubular portions adjacent to each other among the plurality of tubular portions integrally with each other. The rectifying mechanism suppresses the swirling flow by allowing the blown-out air to pass through the through-holes. Therefore, it is possible to shorten a distance necessary for rectification of an air flow while ensuring a good rectification property in rectifying the air flow by suppressing the swirling flow. For that reason, it is possible to reduce a thickness of the rectifying mechanism in the air flow direction.

In addition, according to a thirteenth aspect, the through-hole is the hole whose cross section orthogonal to the axial direction has the hexagonal shape or the circular shape. Therefore, it is easy to densely arrange the plurality of tubular portions in which the through-holes are formed, and it is possible to increase rigidity of the air conditioning case by the rectifying mechanism.

In addition, according to a fourteenth aspect, each of the through-holes is a hole whose cross section orthogonal to the axial direction has the rectangular shape, and is arranged radially in the radial direction of the blower fan. Therefore, in a case where the shape of the arrangement portion of the rectifying mechanism in the air conditioning case is the cylindrical shape according to the outer shape of the blower fan, it is easy to make the passage cross-sectional areas of the plurality of through-holes uniform, and it is possible to suppress the variation in the wind speed distribution of the air passing through the rectifying mechanism to adjust the wind speed distribution.

In addition, according to a fifteenth aspect, the air conditioning case has the rectifying mechanism circumferential surface facing the portion of the in-case passage at which the rectifying mechanism is arranged from the outside in the radial direction of the blower fan. The rectifying mechanism circumferential surface is formed so that the cross section thereof orthogonal to the axial direction has the circular shape centered on the fan axis and surrounds the rectifying mechanism. In addition, the plurality of through-holes extending in the axial direction are formed in the rectifying mechanism, and the plurality of through-holes are arranged so as to be aligned around the fan axis along the rectifying mechanism circumferential surface. The rectifying mechanism suppresses the swirling flow by allowing the blown-out air to pass through the plurality of through-holes.

Here, an air flow constituting the swirling flow is along each hole wall surface facing the through-holes of the rectifying mechanism, such that the swirling flow is suppressed. If the plurality of through-holes are arranged as described above, it is easy to form each through-hole so that the wall surface directions that the hole wall surfaces of each through-hole suppressing the swirling flow form relative to the swirl direction (specifically, the direction facing the circumferential direction of the blower fan) of the swirling flow are identical to each other in all through-holes. Therefore, it is easy to make a ventilation resistance of the rectifying mechanism uniform over the entire rectifying mechanism while maintaining a rectification property of the rectifying mechanism. If the ventilation resistance can be made uniform, the turbulence of the wind flow is also suppressed, and it is thus possible to reduce pressure loss of the wind flow.

In addition, according to a sixteenth aspect, the plurality of through-holes are formed so that the passage cross-sectional areas of the through-holes are identical to each other. Therefore, it is possible to more sufficiently achieve uniformity of the ventilation resistance of the entire rectifying mechanism as compared with the fifteenth aspect.

In addition, according to a seventeenth aspect, the rectifying mechanism has a plurality of partition plates partitioning between through-holes adjacent to each other among the plurality of through-holes. The plurality of partition plates are formed so that plate thicknesses of the partition plates are identical to each other. Therefore, it is possible to more sufficiently achieve uniformity of the ventilation resistance of the entire rectifying mechanism as compared with the fifteenth aspect.

In addition, according to an eighteenth aspect, the plurality of blow-out ports arranged at positions offset from the fan axis to one side in one direction orthogonal to the fan axis and blowing out the air to the outside of the air conditioning case are formed in the air conditioning case. In addition, the rectifying mechanism has the edge portion extending in the blow-out port arrangement direction on one side in the one direction, and the edge portion is configured by arranging some tubular portions of the plurality of tubular portions in the blow-out port arrangement direction. In addition, in the edge portion, the numbers of through-holes that fall within ranges of the blow-out port widths occupied by each of the plurality of blow-out ports in the blow-out port arrangement direction are aligned with each other in a case of comparing the respective blow-out port widths with each other. Therefore, as compared with a case where the through-holes included in the edge portion of the rectifying mechanism are arranged regardless of the blow-out port widths, it is possible to suppress the variation in the airflow ratio of the air flowing to each blow-out port.

In addition, according to a nineteenth aspect, the plurality of blow-out ports arranged at positions offset from the fan axis to one side in one direction orthogonal to the fan axis and blowing out the air to the outside of the air conditioning case are formed in the air conditioning case. In addition, any of the outer end portions of the plurality of rectifying plates are provided as one end portions positioned closer to one side than the position of the fan axis in the one direction. In addition, the positions of the blow-out port boundary portions are aligned with those of the one end portions in the blow-out port arrangement direction. Therefore, as compared with a case where the positions of the blow-out port boundary portions are arranged regardless of the positions of the one end portions, a wind is smoothly directed to the plurality of blow-out ports, such that it is possible to improve air distribution performance that the wind is evenly sent to the plurality of blow-out ports.

In addition, according to a twentieth aspect, the plurality of blow-out ports arranged at positions offset from the fan axis to one side in one direction orthogonal to the fan axis and blowing out the air to the outside of the air conditioning case are formed in the air conditioning case. In addition, at least any of the plurality of rectifying plates are provided as a predetermined rectifying plate formed so as to extend from one side to the other side in the one direction. In addition, the predetermined rectifying plate has one end portion at one end in the one direction, and the one end portion is positioned closer to one side than the position of the fan axis in the one direction. In addition, the positions of the blow-out port boundary portions are aligned with those of the one end portions in the blow-out port arrangement direction. Therefore, similar to the nineteenth aspect, a wind is smoothly directed to the plurality of blow-out ports, such that it is possible to improve air distribution performance to the plurality of blow-out ports.

In addition, according to a twenty-first aspect, the blower fan is the centrifugal fan that sucks the air from one side in the axial direction by the rotation of the blower fan and blows out the sucked air to the outside in the radial direction of the blower fan. The rectifying mechanism has the other side portion provided on the other side in the axial direction with respect to the blower fan and the fan circumferential portion arranged in the fan circumferential space and guiding the air to the other side portion. Therefore, as compared with a case where the rectifying mechanism does not have the fan circumferential portion, it is easy to make an airflow distribution of the air flowing from the blower fan into the rectifying mechanism uniform while ensuring a good rectification property of the rectifying mechanism.

In addition, according to a twenty-second aspect, the fan circumferential portion of the rectifying mechanism has the circumferential rib protruding from the other side portion to one side in the axial direction and extending in the circumferential direction of the fan axis. In addition, the air conditioning case has the circumferential case surface facing the fan circumferential space, and the circumferential rib is provided at a position spaced apart from the circumferential case surface. Therefore, it is possible to adjust an airflow of air flowing from the blower fan to the outside in the radial direction of the circumferential rib by the circumferential rib.

In addition, according to a twenty-third aspect, the rectifying mechanism has the plurality of rectifying plates extending from the inside to the outside in the radial direction of the blower fan. Each of the plurality of rectifying plates has the first plate portion included in the other side portion of the rectifying mechanism and the second plate portion included in the fan circumferential portion of the rectifying mechanism. Therefore, it is possible to obtain a function similar to the function of the rectifying plate of the fifth aspect, and it is easy to make an airflow distribution of the air flowing from the blower fan into the rectifying mechanism uniform while ensuring a good rectification property of the rectifying mechanism, similar to the twenty-first aspect.

The invention claimed is:
1. An air-conditioning unit for a vehicle, comprising:
an air conditioning case that defines therein an in-case passage through which air flows;
a blower that includes a blower fan rotating about a fan axis and arranged in the in-case passage, the blower blowing out an air drawn from one side in an axial direction of the fan axis by rotation of the blower fan; and
a rectifying mechanism that is arranged downstream of the blower fan in an airflow direction in the in-case passage, the air blown by the blower fan passing through the rectifying mechanism, wherein
the blower fan has an other side of the fan axis that is opposite to the one side in the axial direction and is arranged so that the other side of the fan axis extends toward a downstream side of the in-case passage, and
the rectifying mechanism is configured to suppress a swirling flow generated by the rotation of the blower fan in the air blown out from the blower fan as compared with the blown-out air prior to flowing into the rectifying mechanism, wherein
the rectifying mechanism has a plurality of tubular portions defining a plurality of through-holes that extend along the axial direction,
the plurality of tubular portions are disposed so that the plurality of through-holes are arranged in parallel with each other,
the rectifying mechanism is formed by integrally arranging neighboring ones of the plurality of tubular portions with each other, and the rectifying mechanism is configured to suppress the swirling flow by allowing the blown-out air to pass through the plurality of through-holes, wherein a plurality of blow-out ports are formed in the air conditioning case at positions offset from the fan axis to one side of one direction orthogonal to the fan axis, the plurality of blow-out port blowing out the air to an outside of the air conditioning case, the air passing through the rectifying mechanism is distributed and flows into each of the plurality of blow-out ports, the plurality of blow-out ports are arranged along a blow-out port arrangement direction intersecting the axial direction, the rectifying mechanism has an edge portion extending along the blow-out port arrangement direction on the one side in the one direction, the edge portion is formed by arranging some of the plurality of tubular portions along the blow-out port arrangement direction, each of the plurality of blow-out ports in the edge portion has a blow-out port width along the blow-out port arrangement direction, and the number of the plurality of through-holes within the blow-out port width of each of the plurality of blow-out ports is equal to each other.

2. The air-conditioning unit for a vehicle according to claim 1, wherein each of the plurality of through-holes is a hole having a cross-section orthogonal to the axial direction with a hexagonal or circular shape.

3. An air-conditioning unit for a vehicle, comprising:

an air conditioning case that defines therein an in-case passage through which air flows;

a blower that includes a blower fan rotating about a fan axis and arranged in the in-case passage, the blower blowing out an air drawn from one side in an axial direction of the fan axis by rotation of the blower fan; and a rectifying mechanism that is arranged downstream of the blower fan in an airflow direction in the in-case passage, the air blown by the blower fan passing through the rectifying mechanism, wherein the blower fan has an other side of the fan axis that is opposite to the one side in the axial direction and is arranged so that the other side of the fan axis extends toward a downstream side of the in-case passage, and the rectifying mechanism is configured to suppress a swirling flow generated by the rotation of the blower fan in the air blown out from the blower fan as compared with the blown-out air prior to flowing into the rectifying mechanism, wherein the rectifying mechanism has a plurality of rectifying plates extending from an inside to an outside of the blower fan in a radial direction, a plurality of rectifying passages are defined between the plurality of rectifying plates to allow the air to flow from an airflow upstream side to an airflow downstream side of the rectifying mechanism in the in-case passage, the rectifying mechanism is configured to suppress the swirling flow by allowing the blown-out air to pass through the plurality of rectifying passages, a plurality of blow-out ports are formed in the air conditioning case at positions offset from the fan axis to one side of one direction orthogonal to the fan axis, the plurality of blow-out ports blowing out the air to an outside of the air conditioning case, the air passing through the rectifying mechanism is distributed and flows into each of the plurality of blow-out ports, the plurality of blow-out ports are arranged along a blow-out port arrangement direction intersecting the axial direction, the air conditioning case has a plurality of blow-out port boundary portions that define the plurality of blow-out ports therebetween, the plurality of rectifying plates have outer end portions at outer ends thereof in the radial direction, some of the outer end portions of the plurality of rectifying plates are defined as one end portions that are positioned on the one side of the fan axis in the one direction, and the plurality of blow-out port boundary portions are aligned and correspond with positions of the one end portions in the blow-out port arrangement direction.

4. An air-conditioning unit for a vehicle, comprising:

an air conditioning case that defines therein an in-case passage through which air flows;

a blower that includes a blower fan rotating about a fan axis and arranged in the in-case passage, the blower blowing out an air drawn from one side in an axial direction of the fan axis by rotation of the blower fan; and a rectifying mechanism that is arranged downstream of the blower fan in an airflow direction in the in-case passage, the air blown by the blower fan passing through the rectifying mechanism, wherein the blower fan has an other side of the fan axis that is opposite to the one side in the axial direction and is arranged so that the other side of the fan axis extends toward a downstream side of the in-case passage, and the rectifying mechanism is configured to suppress a swirling flow generated by the rotation of the blower fan in the air blown out from the blower fan as compared with the blown-out air prior to flowing into the rectifying mechanism, wherein the rectifying mechanism has a plurality of rectifying plates that define a plurality of rectifying passages therebetween, each of the plurality of rectifying passages is a passage allowing the air to flow from an airflow upstream side to an airflow downstream side of the rectifying mechanism in the in-case passage, the rectifying mechanism is configured to suppress the swirling flow by allowing the blown-out air to pass through the plurality of rectifying passages, a plurality of blow-out ports are formed in the air conditioning case at positions offset from the fan axis to one side of one direction orthogonal to the fan axis, the plurality of blow-out ports blowing out the air to an outside of the air conditioning case, the air passing through the rectifying mechanism is distributed and flows into each of the plurality of blow-out ports, the plurality of blow-out ports are arranged along a blow-out port arrangement direction intersecting the axial direction, the air conditioning case has a plurality of blow-out port boundary portions that define the plurality of blow-out ports therebetween, at least some of the plurality of rectifying plates are defined as specified rectifying plates that extend from the one side to the other side in the one direction, the specified rectifying plates have one end portions at one ends in the one direction, the one end portions of the specified rectifying plates are positioned on the one side of the fan axis in the one direction, and the plurality of blow-out port boundary portions are aligned with positions of the one end portions of the specified rectifying plates in the blow-out port arrangement direction.

5. An air-conditioning unit for a vehicle, comprising:

an air conditioning case that defines therein an in-case passage through which air flows;

a blower that includes a blower fan rotating about a fan axis and arranged in the in-case passage, the blower blowing out an air drawn from one side in an axial direction of the fan axis by rotation of the blower fan; and a rectifying mechanism that is arranged downstream of the blower fan in an airflow direction in the in-case passage, the air blown by the blower fan passing through the rectifying mechanism, wherein the blower fan has an other side of the fan axis that is opposite to the one side in the axial direction and is arranged so that the other side of the fan axis extends toward a downstream side of the in-case passage, and the rectifying mechanism is configured to suppress a swirling flow generated by the rotation of the blower fan in the air blown out from the blower fan as compared with the blown-out air prior to flowing into the rectifying mechanism, wherein the blower fan is a centrifugal fan that sucks the air from the one side of the axial direction by the rotation of the blower fan and that blows out the sucked air to an outside of the blower fan in a radial direction, a fan circumferential space is defined in the air conditioning case as a part of the in-case passage to surround the blower fan from the outside in the radial direction of the blower fan, the air flowing into the fan circumferential space from the blower fan, the air conditioning case is configured to guide the air flowing from the blower fan into the fan circumferential space toward the other side opposite to the one side in the axial direction, and the rectifying mechanism has an other side portion that is disposed on the other side of the blower fan in the axial direction and a fan circumferential portion that is disposed in the fan circumferential space to guide the air toward the other side portion.

6. The air-conditioning unit for a vehicle according to claim 5, wherein the fan circumferential portion has a circumferential rib protruding from the other side portion toward the one side in the axial direction and extending along the circumferential direction of the fan axis, the air conditioning case has a circumferential case surface facing the fan circumferential space, and the circumferential rib is disposed at a position spaced apart from the circumferential case surface.

7. The air-conditioning unit for a vehicle according to claim 5, wherein the rectifying mechanism has a plurality of rectifying plates extending from an inside to the outside of the blower fan in a radial direction, a plurality of rectifying passages are defined between the plurality of rectifying plates to allow the air to flow from an airflow upstream side to an airflow downstream side of the rectifying mechanism in the in-case passage, the rectifying mechanism is configured to suppress the swirling flow by allowing the blown-out air to pass through the rectifying passages, and each of the plurality of rectifying plates has a first plate portion included in the other side portion and a second plate portion included in the fan circumferential portion.

8. The air-conditioning unit for a vehicle according to claim 1, further comprising a heater that is arranged downstream of the blower fan in the airflow direction in the in-case passage to heat the air therein, wherein the in-case passage includes a bypass passage allowing the air to bypass the heater and to flow through the bypass passage, and the rectifying mechanism is configured to suppress the swirling flow generated in the air, among the blown-out air, that flows through the bypass passage as compared with the air flowing through the bypass passage prior to flowing into the rectifying mechanism.

\* \* \* \* \*